United States Patent Office 3,214,759
Patented Oct. 26, 1965

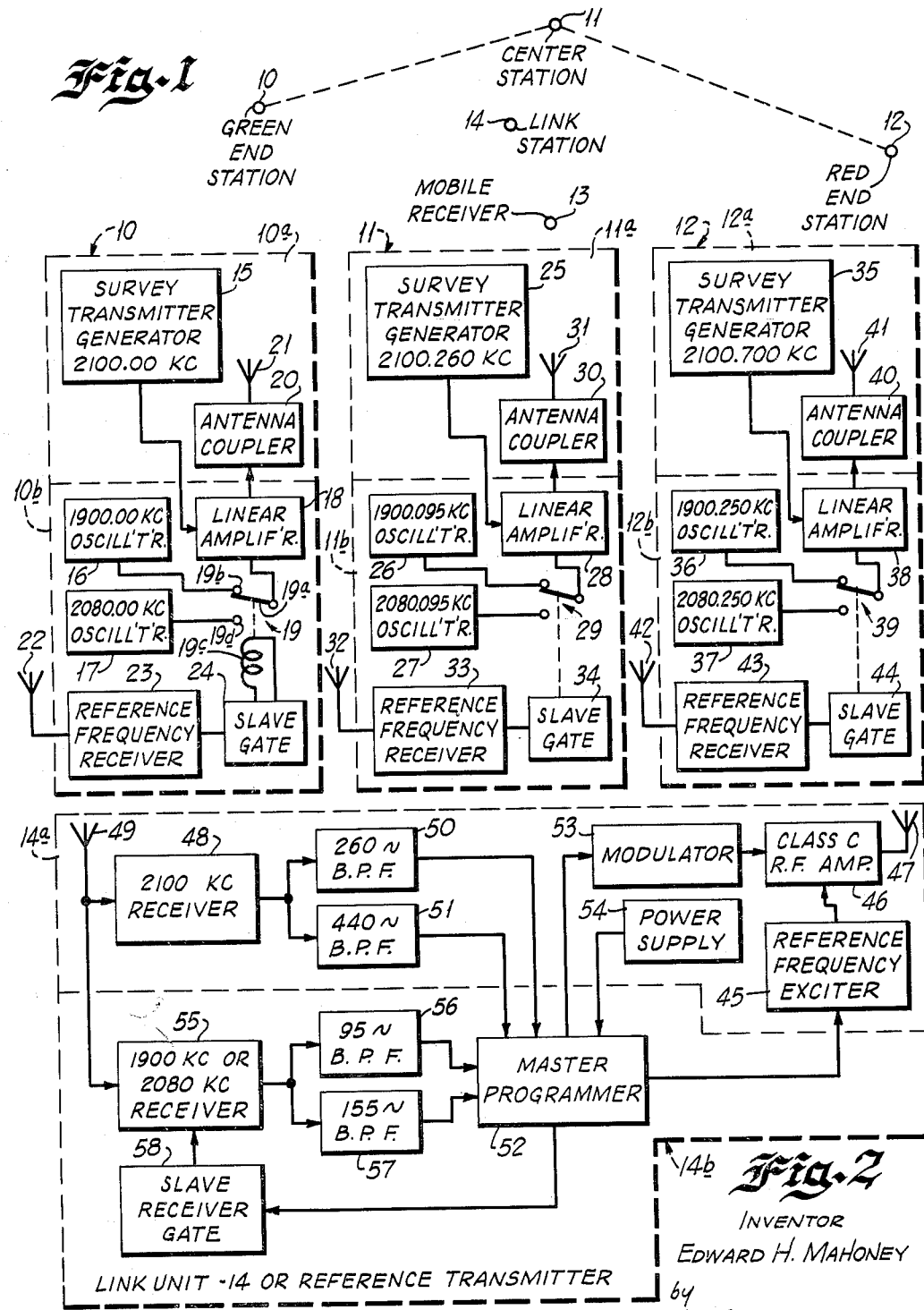

3,214,759
APPARATUS FOR PROVIDING LANE IDENTIFI-
CATION IN HYPERBOLIC POSITION FINDING
SYSTEMS
Edward H. Mahoney, Tulsa, Okla., assignor to Seismo-
graph Service Corporation, Tulsa, Okla., a corporation
of Delaware
Filed Apr. 19, 1962, Ser. No. 188,692
21 Claims. (Cl. 343—105)

The present invention relates generally to radio position determining systems and is more particularly concerned with improvements in providing lane identification in radio position finding systems of the hyperbolic continuous wave type employing phase comparison in pairs of position indicating signals radiated from a plurality of spaced transmitting points to provide one or more indications from which the position of a mobile receiving point relative to the known locations of the transmitters may be determined very accurately. The invention is particularly concerned with a new and improved system of the above type including apparatus for modifying existing radio position finding systems to provide lane identification by utilizing a minimum amount of additional equpment and without discarding the equipment already in service.

In systems of the particular type referred to, the continuous waves radiated from each pair of transmitters bear a phase relationship at the mobile receiving unit which changes as a function of the changing position of the latter unit relative to the transmitting points. More specifically the waves radiated by each pair of transmitting units of the system are characterized by isophase lines which are hyperbolic in contour about the transmitting points as foci. With this system arrangement, the position of a receiving point relative to a pair of hyperbolic isophase lines may be determined by measuring the phase relationship between waves radiated from the pairs of transmitters. Since the point of location of the receiving point along the zone separating the two isophase lines is not indicated by such a phase measurement, it is desirable to employ at least three spaced transmitters, different pairs of which function to provide a grid-like pattern of intersecting hyperbolic isophase lines in order to obtain a position fix providing an absolute determination of the position of the receiving point.

In Honore Patent No. 2,148,267 a system is disclosed in which the waves radiated from each pair of transmitters are heterodyned at a fixed linked transmitting point and the difference frequency between the heterodyned waves is modulated as a reference signal on the carrier wave output of the link transmitter for radiation to the receiving point where the difference frequency component is detected and phase compared with the difference frequency signal derived by directly hererodyning the transmitted continuous waves arriving at the receiving point from the pair of transmitters. In this manner any phase shifts between the continuous waves radiated from the two transmitters are completely compensated so that the measured phase angle is truly representative of the location of the receiving point between the pair of isophase lines. In Hawkins Patent No. 2,513,316 an improved system is disclosed wherein a single reference transmitter is employed as a link transmitter for radiating all of the reference signals to the mobile receiving point, thereby reducing the number of signal channels required as well as the amount of equipment necessary to provide a complete system.

A particular problem encountered in the operation of continuous wave systems of the type disclosed in the Honore and Hawkins patents is that of eliminating ambiguity from the phase measurements which provide the desired position information. Thus, while the two phase measurements identify the position of the receiving station relative to two intersecting hyperbolic isophase lines, they do not identify the particular pair of lines to which the indications are related. This means that in operating the system, the geographic location of the receiving point must be known at the start of movement of the receiver relative to the transmitting stations and furthermore that the successive wavelengths or lanes traversed must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

One means employed heretofore for identifying the lanes or grids has been to provide an integrating counter mechanism which adds or subtracts a digit when the phase indicator undergoes a change of 360 degrees. Since a lane is crossed whenever such a 360 degree change occurs, the lanes are continuously identified by the integrating counter while the phase indicator provides information concerning the precise position of the mobile receiver within the lane identified. A system of this type, however, requires continuous, uninterrupted operation of the transmitting and receiving facilities even since relatively short periods of interrupted operation may result in the loss of one or more counts on the integrating counters if the mobile receiving unit moves during the period of interruption. Such interruptions might be caused by failure of the indicating, receiving or transmitting equipment for short periods of time, or in the alternative, by the presence of a weak signal area in the field pattern of the transmitting system. The presence of a weak signal area, which might be caused by local conditions adversely affecting radio wave propagation, renders the receiver insensitive to phase changes and, hence, the mobile unit may pass through a lane without at the same time adding or substracting a digit from the counting mechanism. As soon as the signal strength returns to normal or when the system is restored to normal operation, the phase indicator again provides accurate information concerning the location of the mobile craft but the integrating counters have, in the meantime, failed to record the lane change and as a result the actual position of the receiver cannot be determined. It would, of course, be desirable to provide a system for providing lane identification either independently of or in cooperation with the integrating counters so that accurate lane identification may be provided either initially when the mobile receiver enters the radiation pattern of the transmitters or at the completion of any period of interruption. The satisfaction of the latter desire therefore constitutes one of the principal objects of the present invention.

It has been found that in order to provide accurate position information and also in order to obtain frequency allocations from the Federal Communications Commission, the transmitters used in position finding systems of the type described above must operate at radio frequencies in the order of 1500 to 2000 kilocycles. When operating with such frequencies, one lane is only about 250 feet in the area along the base line extending between each pair of transmitters of the system. It has been suggested in several prior art patents, for example, in Palmer Patent Re. 24,891; Hawkins Patent No. 2,652,558; O'Brien Patent No. 2,598,290 and Hastings Patent No. 2,528,140, that ambiguity of the fine position indications can be resolved by, in effect, providing a second transmitting system operating at a different frequency from the first to provide position indications in terms of the frequency difference between the two systems. However, as is pointed out in the Palmer patent, the difference frequency indications provided are ambiguous and the lanes of the "difference frequency" system are often so narrow that they do not cover any appreciable portion of the survey area. Thus, to provide coverage of a significant area, it is desirable to provide, in addition to the fine or accurate position indications and the medium indications of the "difference frequency" system, coarse indications for resolving ambiguity of the medium system. Prior systems for effecting this result have been characterized by several disadvantages. First, some systems have required an interruption in the transmission of signals from the transmitters of the fine system and a switchover to the transmission of the signals of the second system. The operator at the mobile unit is then called upon to read the new phase indication provided by the second system and to mentally compute the difference between the latter indication and the original one provided by the fine system. Obviously, this is a laborious and time consuming operation and one which is subject to considerable human error and it is, therefore, desirable to provide a system in which the "difference" indications are measured automatically and without resort to mental computation. Other systems have required the use of several radiating antennas at the same transmitting station or, in the alternative, three or more RF signals must be radiated simultaneously from the same antenna either in the form of three separate carrier waves or two carrier waves and one or more sidebands of modulation components. The use of separate antennas at each station is not practical in systems where the position measurement is accurate to within a few feet. Separation of the transmitting antennas by several feet at each station may destroy this accuracy. Moreover, even the use of separate antennas does not avoid the problem of high power radiation from one antenna to the other when these antennas are located very close together. Applicant has found that the radiation of more than two signals simultaneously from the same antenna creates loading problems which cannot easily be solved and, as a result, it would be desirable to provide a system for developing both fine, medium and coarse position indications without requiring the simultaneous radiation of more than two signals from the transmitting stations. The satisfaction of the latter desire constitutes another important object of the present invention.

A principal object of the present invention is to provide a new and improved apparatus for effecting lane identification in a hyperbolic continuous wave radio position finding system.

Another object of the present invention is to provide a new and improved transmitting system for use in radio position finding systems of the type described above.

The invention has for a further object the provision of a new and improved mobile receiving equipment for use in radio position finding systems of the type described above and including apparatus operative automatically to provide lane identification and without resort to mental computations.

It is a further object of the present invention to provide a system of the character described above wherein the equipment necessary for providing lane identification can be added to presently existing apparatus with a minimum amount of modification, thus economizing upon the installation cost and also preventing obsolescence of the existing apparatus.

The invention has for another object the provision of lane identification equipment of the character described which is simple in construction and, therefore, inexpensive to manufacture.

The invention, both as to its organization and manner of operation, together with further objects and advantages will best be understood by reference to the following description taken in conjunction with the accompanying drawings wherein:

FIG. 1 is a schematic diagram showing a typical arrangement of the transmitters of a three foci transmitting system characterized by the features of the present invention together with a mobile receiving unit whose position is to be determined;

FIG. 2 diagrammatically illustrates the equipment employed at the two end transmitting stations, the center station and the link or reference transmitting station of the transmitting system;

Figure 3:
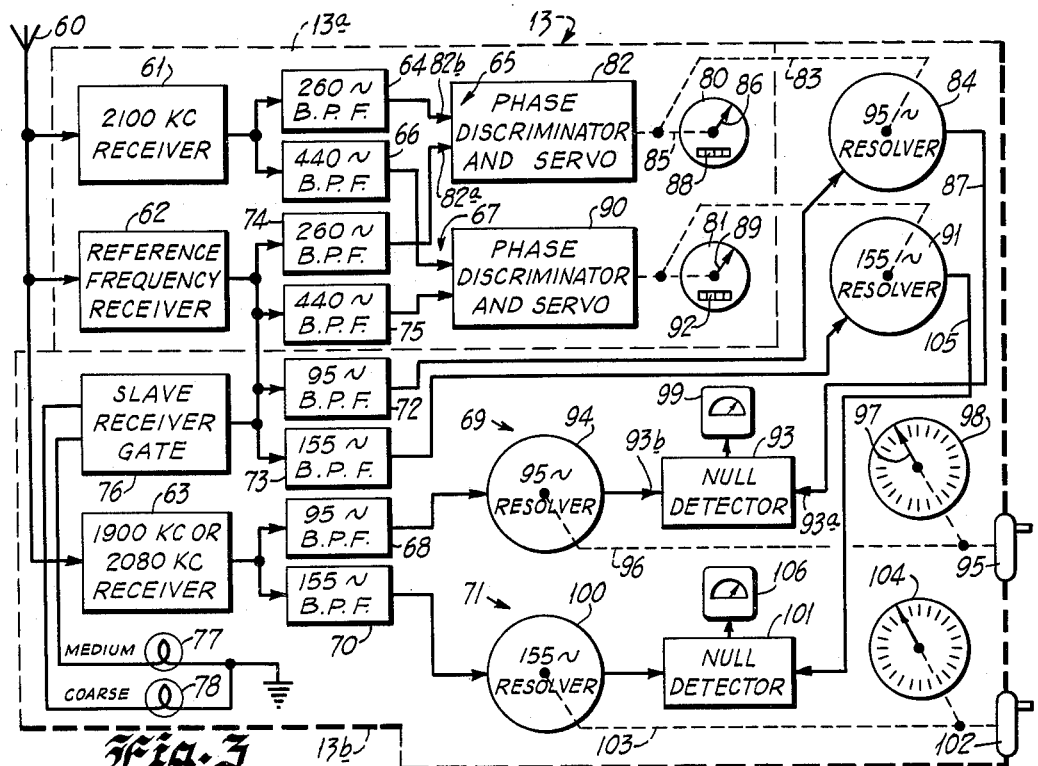
FIG. 3 is a diagrammatic representation of a mobile receiving unit for use with the transmitting system shown in FIG. 2 to provide a determination of the position of a mobile craft operating within the field pattern of the transmitting system.

Referring now to the drawings and more particularly to FIG. 1 thereof, the invention is there illustrated as embodied in a three foci hyperbolic, continuous wave system for providing position information at any number of mobile receiving units 13 (FIG. 3) which may be carried on vessels or vehicles operating within the transmission field of a plurality of spaced apart transmitters or transmitting units 10, 11, 12 and 14. The transmitters 10, 11 and 12 are preferably spaced apart approximately equal distances and are so positioned that an imaginary base line joining the points of location of the units 10 and 11 is angularly related to a similar base line joining the points of location of the units 11 and 12. As a consequence, the transmitter or transmitting unit 11 may be considered to be the center transmitter while the transmitting units 10 and 12 may be referred to as the end transmitters with these units, for convenience, being respectively referred to as the Green End Station and the Red End Station in ensuing portions of this description. The transmitting unit 14 is spaced from all three of the units 10, 11 and 12 and, since its function is to receive the signals radiated from the latter stations and to develop therefrom reference signals for radiation as modulation components, it is designated as the reference or link station. More specifically, the equipment provided at each of the transmitting stations 10, 11 and 12 is effective to radiate continuously a first position indicating signal for use at the mobile receiving unit 13 in providing a fine or accurate position indication and, in addition, to radiate alternately second and third ambiguity resolution signals for use at the mobile receiving unit to provide medium and coarse position indications, respectively. The three fine position indicating signals continuously radiated from the stations 10, 11 and 12 fall within a first frequency channel, which, for convenience, will be referred to hereinafter simply as the position indicating channel, while the two different ambiguity resolution signals alternately radiated fall within two different frequency channels, respectively, called hereinafter the first ambiguity resolution channel and the second ambiguity resolution channel, with each of the latter channels including one of the ambiguity resolution signals radiated from each of the three stations.

The reference station 14 is equipped to receive all of the position indicating and ambiguity resolution signals radiated from the transmitting stations 10, 11 and 12 and to heterodyne these signals in pairs in order to develop reference signals for radiation as modulation components upon a carrier wave emitted from the reference station. The latter carrier wave lies within a fourth frequency channel which is different from the position indicating signal channel and also from the two ambiguity resolution signal channels. The carrier wave emitted from the reference station is modulated with reference signals derived from heterodyning the position indicating signals in pairs and is also alternately modulated with reference signals derived from heterodyning in pairs the signals of the two ambiguity resolution channels. The signal from the reference station 14 is also coded as described below to render each of the stations 10, 11 and 12 alternately effective in synchronism to radiate the two ambiguity resolution signals and also to render each mobile receiving unit 13 effective to receive and use the particular set of ambiguity resolution signals being emitted from the transmitting stations 10, 11 and 12.

The mobile receiver 13 is equipped to receive all of the position indicating and ambiguity resolution signals as well as the coded reference station wave with its modulating reference signals. The mobile receiver responds to the signals of the position indicating channel and to the signal from the reference station by providing a first fine or accurate position indication representing the location of the mobile craft relative to a first family of hyperbolic, isophase lines having foci at the transmitting stations 10 and 11 and by providing a second fine or accurate position indication representing the location of the mobile craft relative to a second family of hyperbolic, isophase lines having foci at the transmitting stations 11 and 12. The mobile receiver 13 is also equipped to count the lanes of the two families of isophase lines traversed by the mobile craft. During the period when the ambiguity resolution signals of the first ambiguity resolution channel are being received this receiver is effective to provide automatically a medium position indication representing the location of the mobile craft relative to hyperbolic isophase lines having foci at the transmitting stations 10 and 11 and to provide another medium position indication representing the location of the craft relative to another set of hyperbolic lines having foci at the stations 11 and 12. During the period when the signals of the second ambiguity resolution channel are being received, the receiver 13 provides automatically a coarse position indication representing the location of the mobile craft relative to widely spaced hyperbolic isophase lines having foci at the transmitting stations 10 and 11 and also provides a second coarse position indication representing the location of the craft relative to a set of widely spaced isophase lines having foci at the stations 11 and 12.

Briefly considered, the equipment provided at the Green End Transmitting Station 10 comprises three different oscillators or wave signal generators 15, 16 and 17 of conventional construction which are respectively adapted to develop signals having different frequencies. While the particular frequencies used in the system are unimportant, the oscillators have been assigned specific frequenciese to facilitate the description. Thus, the oscillator or generator 15 develops signals having a frequency of 2100.00 kilocycles which are continuously supplied to linear amplifier 18 of the type described in detail in United States Patent No. 2,872,676 assigned to the same assignee as the present invention. Oscillators 16 and 17 respectively develop signals of 1900.00 and 2080.00 kilocycles which are alternately supplied through the contacts of a switching relay 19 to the linear power amplifier 18. The latter amplifier functions in the manner described in the above-identified Patent No. 2,872,676 to combine the two input signals linearly in order to develop an output signal free of intermodulation components and this output signal is supplied through an antenna coupler 20 for emission from a radiating antenna 21. The relay is effective to connect the output of the oscillators 16 and 17 one at a time to the input of the linear power amplifier 18. Thus, with the relay 19 deenergized, its movable arm or pole 19a engages a fixed contact 19b to deliver the signals from the oscillator 16 to the power amplifier. When the relay 19 is energized by supplying current to its operating coil 19c in a manner described hereafter, the pole 19a is drawn into engagement with a fixed contact 19d to deliver signals from the oscillator 17 to the amplifier 18. The energization of the relay 19 is controlled by coding the signal from the reference station 14, for example, by interrupting the transmission of the carrier wave or, in the alternative, by modulating the latter wave with a tone switching signal of predetermined audio frequency. In the ensuing description, it will be assumed that the coding of the signal from the reference station is accomplished by interrupting the transmission for a brief period. To control the operation of the relay 19, the equipment provided at the Green End Station 10 includes a receiving antenna 22 connected through an antenna coupler (not shown) to a conventional superheterodyne receiver 23 which is tuned to receive the carrier wave radiated from the reference station. The receiver 23 drives a slave exciter gate circuit 24 which includes a detector circuit for determining the presence or absence of signals from the reference station. It may comprise a circuit for developing a control signal wherever the carrier wave radiation from the reference station is terminated. This control signal is passed to a timing circuit which drives the relay coil 19c to energize the relay. The timing circuit maintains the relay 19 energized both during the off period of the reference station and for a predetermined interval thereafter. To facilitate the description, let it be assumed that the reference station is so programmed that it is off for a period of ten seconds and is then effective to radiate its carrier wave for a period of one minute and fifty seconds, thus providing a two minute cycle. The relay 19 is energized both for the ten second off period and for a predetermined interval of fifty seconds thereafter as controlled by the timing circuit in the slave gate 24. At the completion of the fifty second interval, the reference station will be radiating its carrier wave and the slave gate 24 will supply no energizing signal for the relay 19. The latter relay then remains deenergized for the remaining one minute of the cycle to supply the output of the oscillator 16 to the linear amplifier 18. Thus, it will be observed that the amplifier 18 is alternately excited by 2080.00 and 1900.00 kilocycle signals respectively supplied from the oscillators 16 and 17 with each signal being supplied for a one minute period. These two signals are thus alternately radiated from the antenna 21 while the 2100.00 kilocycle signal from the oscillator 15 is continuously radiated from this antenna.

In accordance wth an important feature of the present invention the equipment for providing lane identification is adapted to be added to presently existing equipment in which lane identification is effected solely by the aforementioned integrating connectors. The modifications necessary to add the lane identification facilities of the present invention are very slight. Thus, the fine position indications provided by the signals continuously radiated from the stations 10, 11 and 12 and by the reference signal radiation from the link unit 14 are obtained by equipment which is very similar to the systems shown in U.S. Patent No. 2,513,316. Since a number of systems of the latter type are presently in operation, it is desirable to incorporate the lane identification therein while preserving the original equipment to as great a degree as possible. The existing equipment at the four transmitting stations 10, 11, 12 and 14 has been shown within the broken line rectangles 10a, 11a, 12a and 14a, respectively, while the equipment which must be added for lane identification has been shown within the broken line rectangles 10b, 11b, 12b and 14b, respectively. Similarly, the equipment previously used at the mobile receiving unit 13 is shown within the broken lines 13a while the equipment to be added according to the present invention is shown within the broken lines 13b. It will be observed that at the transmitters 10, 11, 12 and 14 almost all of the original equipment including the oscillators, the antennas, the couplers, the modulators and filters at the station 14 etc. has been preserved for use in the system of the present invention. The entire original mobile receiving unit has also been used thus avoiding the necessity for completely discarding all such receivers presently in use.

The equipment provided at the Center Station 11 is identical to that at the Green End Station 10 except for the frequencies of the oscillators or wave signal generators. Thus, the Center Station is provided with three RF oscillators 25, 26 and 27 respectively developing signals having frequencies of 2100.260, 1900.095 and 2080.95 kilocycles. Here again, the output of the oscillator 25 is continuously applied to a linear power amplifier 28 like the amplifier 18 referred to above, while the outputs of the oscillators 26 and 27 are alternately supplied to the linear amplifier 28 through the contacts of a relay 29 which is identical to the relay 19 previously described. The linear amplifier 28 combines the applied input signals linearly and supplies its output signals through an antenna coupler 30 for radiation from an emitting antenna 31. The operation of the relay 29 is controlled by the coded reference station signals in exactly the same manner as described above and, as a result the Center Station includes a receiving antenna 32 coupled through an antenna coupler (not shown) to a conventional superheterodyne receiver 33. The latter receiver is again tuned to accept the carrier wave radiated from the reference station 14 and is sufficiently selective to reject the signals falling within the position indicating signal channel and also those falling within the two ambiguity resolution signals. The output of the receiver 33 is supplied to an exciter slave gate circuit 34 exactly like the gate 24 previously described so that the relay 29 is energized in the absence of the carrier wave from the reference station and for a predetermined interval (fifty seconds for example) after the radiation of the carrier wave is resumed. The relay 29 is, of course, deenergized at the completion of the fifty second delay interval. When deenergized, the relay 29 supplies signals from the oscillator 26 to the linear amplifier 28 and, when energized, it supplies signals to the amplifier from the oscillator 27. Thus, the amplier 28 alternately supplies the 1900.095 and 2080.095 kilocycle signals from the oscillators 26 and 27 to the antenna 31 so that these two signals are radiated alternately for one minute periods and, at the same time, the amplifier 28 supplies continuously the 2100.260 kilocycle signal from the oscillator 25 to the antenna 31 so that this signal is continuously radiated.

The equipment provided at the Red End Station 12 is identical to that provided at the Green End Station 10 and at the Center Station 11 except for the operating frequencies of the three oscillators. Thus, the equipment at the Red End Station 12 includes three oscillators 35, 36 and 37 for developing signals respectively having frequencies of 2100.700, 1900.250 and 2080.500 kilocycles. The output of the oscillator 35 is continuously supplied to a linear power amplifier 38 identical to the amplifier 18 described above while the oscillators 36 and 37 are connected alternately through a relay 39 to the power amplifier 38 in a manner which will be obvious in view of the foregoing description. The combined signal output from the power amplifier 38 is supplied through an antenna coupler circuit 40 to an emitting or radiating antenna 41. To provide signals for controlling the operation of the relay 39, the Red End Station includes a receiving antenna 42 connected to a conventional superheterodyne receiver 43. The latter receiver is tuned to accept the carrier wave radiated from the reference station 14 and to reject the remaining signals in the different frequency channels of the transmitting system. The receiver 43 drives a slave exciter gate 44 like the gate 24 described above to energize the relay 39 in the absence of the carrier wave from the reference station and for a fixed interval, i.e., fifty seconds after radiation of this wave has been resumed. At the completion of the fixed delay interval, the slave gate 44 is effective to deenergize the relay. The relay 39 functions to connect the amplifier 38 alternately to the oscillators 36 and 37 in a manner which will be obvious from the foregoing description so that the 1900.250 and 2080.250 kilocycle signals from the oscillators 36 and 37 are radiated alternately from the antenna 41 for one minute periods while, at the same time, the 2100.700 kilocycle signal from the oscillator 35 is radiated continuously throughout both such periods.

In view of the foregoing description, it will be recognized that the three signals developed by the oscillators 15, 25 and 35 fall within the first or position indicating frequency channel. All three of these signals are radiated simultaneously and continuously. The signals developed by the oscillators 16, 26 and 36 fall within the first ambiguity resolution signal channel and are radiated simultaneously with each other for one minute periods. Similarly, the signals developed by the oscillators 17, 27 and 37 fall within the second ambiguity resolution signal channel and are radiated simultaneously with each other but alternately with signals of the first ambiguity resolution channel and for one minute periods beginning with the interruption of carrier wave radiation from the reference station 14 and continuing for fifty seconds after such radiation is resumed. While, as was previously indicated, the particular frequencies are unimportant, in order to provide effective ambiguity resolution using equipment having the usual tolerances or errors, the frequency difference between the signals of the first or position indicating signal channel and those of the first ambiguity resolution channel should be equal to about one tenth (0.1) of the frequency of the position indicating channel while the frequency difference between the signals of the second ambiguity resolution channel and those of the position indicating channel should be about one hundredth (.01) of the position indicating channel frequency.

Considering next the equipment provided at the reference station 14, it will be observed that this equipment includes an RF oscillator or exciter 45 for developing a carrier wave signal having a frequency FR which as was indicated above falls in a frequency channel distinguishable from the other three channels. The output of the oscillator 45 is applied to a conventional class C RF power amplifier 46 which has its output signals supplied through an antenna coupler circuit (not shown) to an emitting or radiating antenna 47. As was previously indicated, the carrier wave developed by the oscillator 45 is adapted to be modulated with reference signals derived from heterodyning the signals received from the stations 10, 11 and 12. To develop these reference signals, the reference station 14 includes a conventional superheterodyne receiver 48 having an input or RF section receiving signals from a receiving antenna 49 through an antenna coupler circuit (not shown). This RF section is tuned to accept the signals in the first or position indicating channel but to reject signals in the two ambiguity resolution signal channels. The receiver 48 is effective to heterodyne in pairs the three signals of the first channel to develop the audio frequency differences or beats therebetween. Thus, the receiver 48 continuously produces an output consisting of a first audio difference signal of 260 cycles derived from heterodyning the 2100.00 and 2100.260 kilocycle signals received from the transmitters 10 and 11, a second audio difference signal of 440 cycles derived from heterodyning the 2100.260 and 2100.700 kilocycle signals received from the transmitting units 11 and 12 and a third audio difference frequency signal of 700 cycles derived from heterodyning the 2100.00 and 2100.700 kilocycle signals respectively received from the transmitting units 10 and 12. These three difference frequency signals are supplied to a pair of bandpass filters 50 and 51 respectively tuned to pass the 260 cycle and 440 cycle signals. The 700 cycle difference signal is, of course, rejected by both of the filters 50 and 51 and, hence, has no effect upon the operation of the reference station. The two difference signals passed by the filters 50 and 51 are applied to a master programmer and linear mixer circuit 52 which combines these signals linearly and without heterodyning them. The circuit 52 has its output connected to a modulator 53 which is effective during most of the cycle to amplitude modulate the carrier wave signal $F_R$ developed by the oscillator 45 with the 260 and 440 cycle reference signals.

The master programmer circuit 52 performs several functions in addition to the mixing of the signals passed by the filters 50 and 51. Thus, it also serves to code the transmissions from the reference station 14 to control the alternate radiation of signals in the two ambiguity resolution channels from the transmitting stations 10, 11 and 12. As was previously indicated this coding could take the form of tone switching signals modulated upon the carrier wave $F_R$ but in the form being described it is accomplished by a coded interruption of transmission of the wave $F_R$ from the station 14. The transmission may be interrupted in any suitable manner, as for example, by supplying power from a power supply 54 to the exciter 45 through a motor driven switch (not shown) in the master programmer circuit. The latter switch, as is well known in this art, may include insulating and conducting sections suitably arranged to supply power to the exciter 45 only during those periods when transmission of the carrier wave $F_R$ is desired. As was indicated above, this switch is constructed and arranged to interrupt radiation of the carrier wave $F_R$ for a ten second period of each two minute cycle so that the carrier wave is, of course, radiated for one minute and fifty seconds of each cycle during which time the wave is continuously modulated by both of the reference signals from the filters 50 and 51. At the same time power is supplied from the motor driven switch to a slave gate circuit 58 for controlling the operation of a receiver 55. More specifically, the receiver 55 must be operated in synchronism with the coding of the reference station so that it is alternately effective to receive signals in the first ambiguity resolution channel (i.e. in the vicinity of 1900 kilocycles) when the transmitters 10, 11, and 12 are radiating such signals and to receive signals in the second ambiguity resolution channel (in the vicinity of 2080 kilocycles) when the later signals are being radiated. To this end, the slave gate 58 includes means (such as a relay) effective during the ten second interruption period of the motor driven switch in the master programmer circuit 52 and for fifty second period thereafter to alter the frequency of the local oscillator in the superheterodyne receiver 55. The local oscillator develops a signal 455 kilocycles higher than the incoming signal so that the local oscillator output and the receiver signals can be mixed to produce the usual 455 kilocycle intermediate frequency. Thus, when the transmitters 10, 11 and 12 are radiating the signal of the second channel the local oscillator signal should be 1900 + 455 or 2355 kilocycles and when these transmitters are radiating signals in the third channel the local oscillator signal should be 2080 + 455 or 2535 kilocycles. This can be accomplished by providing two different local oscillators which are rendered alternately effective in synchronism with the coding of the reference station signal by supplying power from the power supply 54 through the switch in the master programmer circuit 52 to the gate 58. The gate 58 renders the two local oscillators alternately effective for one minute periods.

When the transmitting stations 10, 11 and 12 are effective to radiate simultaneously the signals of the first ambiguity resolution channel in the vicinity of 1900 kilocycles, the receiver 55 accepts these three signals and develops a first difference frequency of 95 cycles as a result of heterodyning the 1900.000 and 1900.095 kilocycle signals respectively radiated from the stations 10 and 11, a second difference frequency of 155 cycles derived from heterodyning the 1900.095 and 1900.250 kilocycle signals respectively radiated from the stations 11 and 12 and a third difference frequency of 250 cycles derived from heterodyning the 1900.000 and 1900.250 kilocycle signals respectively radiated from the stations 10 and 12. During the period when the transmitting stations 10, 11 and 12 are effective to radiate simultaneously the signals of the second ambiguity resolution channel in the vicinity of 2080 kilocycles, the receiver 55 heterodynes these three signals in pairs to develop a difference frequency of 95 cycles as a result of heterodyning the 2080.000 and 2080.095 kilocycle signals respectively radiated from the stations 10 and 11, another difference frequency of 155 cycles derived from heterodyning the 2080.095 and 2080.250 kilocycle signals respectively radiated from the stations 11 and 12, and another difference frequency of 250 cycles derived from heterodyning the 2080.00 and 2080.250 kilocycle signals respectively radiated from the stations 10 and 12. Thus, the three difference signals developed by the receiver 55 when the signals of the first ambiguity resolution channel are being received from the stations 10, 11 and 12 have the same frequencies as the three difference signals developed when the signals of the second ambiguity resolution channel are being received. This is, of course, accomplished by proper selection of frequencies of the oscillators 16, 17, 26, 27, 36 and 37. The three difference frequencies developed by the receiver 55 during both periods of operation are applied to a pair of conventional bandpass filters 56 and 57 for respectively passing the 95 and 155 cycle difference frequencies. The 250 cycle difference frequency is rejected by both of the filters 56 and 57 and, hence, has no effect on the operation of the reference station. The 95 and 155 cycle difference frequencies passed by the filters 56 and 57 are applied to the linear mixer portion of the master programmer circuit where they are combined with the 260 and 440 cycle difference frequencies from the filters 50 and 51. All of the difference frequencies supplied to the master programmer are combined linearly without generating intermodulation components and the combined signals are applied to the amplitude modulator 53 which, of course, modulates the difference frequencies upon the carrier wave $F_R$ developed by the oscillator 45 throughout the one minute and fifty second period when the latter wave is being developed. It will be observed that the selection of frequencies so that the difference frequency between the signals developed by the oscillators 16 and 26 is equal to the difference between the signals developed by the oscillators 17 and 27 and, further that the difference between the signals developed by the oscillators 26 and 36 is equal to the difference between the signals produced by the oscillators 27 and 37, simplifies the equipment used at the reference station since only one receiver and one pair of filters is required to receive all of these signals. In view of the foregoing description, it will be recognized that the reference station 14 is effective to radiate a periodically interrupted carrier wave $F_R$ which, throughout its period of transmission, is continuously modulated by a first pair of 260 and 440 cycle reference signals and which is, at the same time, alternately modulated by second and third pairs of reference signals with each pair of signals being made of a 95 cycle and a 155 cycle audio signal. The two 95 cycle signals and the two 155 cycle signals may differ from each other in phase due to the fact that they are derived from heterodyning different pairs of signals.

As is shown in FIG. 3 of the drawings, the equipment provided at the mobile receiving unit 13 comprises a single receiving antenna 60 connected to an antenna coupler circuit (not shown) to supply input signals for three conventional superheterodyne receivers 61, 62 and 63. The receiver 61 has its RF circuits tuned to accept the signals of the position indicating channel but to reject the signals of the three remaining channels in the system. The signal input circuits of the receiver 62, on the other hand, are tuned to accept the carrier wave $F_R$ and its modulation components but to reject the remaining signals of the other three channels. The receiver 63 has its local oscillator frequency shifted in synchronism with the coding of the reference station signal in a manner somewhat similar to the receiver 55 employed at the reference station 14. The signal input circuits of the receiver 63 are designed to accept both of the ambiguity resolution signal channels and to reject both the carrier wave $F_R$, and the signals of the position indicating channel in the vicinity of 2100 kilocycles. The receiver 61 is continuously effective to heterodyne in pairs the signals of the position indicating channel to develop the difference frequencies therebetween. Thus, the signals received from the transmitting stations 10 and 11 are heterodyned to develop a 260 cycle beat or difference frequency signal which is passed through a bandpass filter 64 to a phase comparison or indicating circuit 65 described more fully hereinafter. The 440 cycle difference signal developed by heterodyning the waves received from the stations 11 and 12 is passed through a bandpass filter 66 to a second phase comparison or indicating circuit 67 which is similar to the phase comparison circuit 65. The 700 cycle difference frequency developed by heterodyning the signals received from the two end stations 10 and 12 is, of course, rejected by both of the filters 64 and 66 and, hence, has no effect upon the operation of the equipment at the mobile receiving unit 13.

The receiver 63 is broadly tuned to accept the signals in both of the ambiguity resolution signal channels, that is, signals in the vicinity of 1900 and 2080 kilocycles. Since the signals in only one of these ambiguity resolution channels are radiated during any particular interval, the signals of both channels do not, of course, arrive at the receiver 63 simultaneously. The three signals of each channel arriving at the receiver 63 at any one time are heterodyned in pairs to develop the 95 cycle difference signal between the signals radiated from the stations 10 and 11 and the 155 cycle difference frequency between the signals received from the stations 11 and 12. The 95 cycle difference signals are passed through a bandpass filter 68 to a phase comparison circuit 69 for the purpose of providing ambiguity resolution in a manner which will become evident as the description proceeds. The 155 cycle difference signals are passed through a bandpass filter 70 to a phase comparison circuit 71 in order to provide ambiguity resolution. The 250 cycle difference between the signals arriving from the end stations 10 and 12 is also developed by the receiver 63 but, here again, this signal has no effect on the operation because it is rejected by both of the filters 68 and 70.

The reference receiver 62 is tuned to accept the carrier wave $F_R$ radiated from the reference station 14 and to reject the other three frequency channels utilized in the system. The receiver 62 detects the modulation components appearing upon the carrier wave radiated by the reference station 14 and develops these modulation components at its output terminals. Both of the 95 cycle reference signals alternately appearing on the wave $F_R$ are passed through a bandpass filter 72 to the phase comparison circuit 65 while both of the alternately appearing 155 cycle reference signals are passed through a filter 73 to the phase comparison circuit 67. The 260 and 440 cycle reference signals are respectively passed through bandpass filters 74 and 75 to the phase comparison circuits 65 and 67. The coded or periodically interrupted reference signal $F_R$ is also used to drive a slave receiver gate circuit 76 which may include a timing circuit like that used at the stations 10, 11 and 12 for performing the function of conditioning the receiver 63 to correspond with the ambiguity resolution channel being radiated by the stations 10, 11 and 12. This is accomplished by connecting to the receiver 63 the proper local oscillator for the frequency channel being received in a manner which will be obvious in view of the foregoing description. In addition, the gate circuit 76 supplies current to an indicating light 77 whenever the signals of the first ambiguity resolution channel are being received and supplies current to an indicating light 78 whenever the signals of the second ambiguity resolution channel are being received. The illumination of the lights 77 and 78 informs the operator at the mobile receiving unit as to whether a medium or coarse ambiguity resolution measurement is being made.

The phase comparison circuit 65 may be referred to as the Green comparison circuit since it utilizes the signals supplied from the receivers 61 and 62 to provide on an indicating device or meter 80 a fine position indication representative of the location of the mobile receiving unit 13 relative to the Green family of closely spaced, hyperbolic, isophase lines having foci at the Center Station 11 and the Green End Station 10. The phase comparison circuit 67 may be referred to as the Red circuit because it provides on a meter 81 a similar fine position indication representative of the location of the mobile receiving unit relative to closely spaced, hyperbolic, isophase lines of the Red family having foci at the Center Station 11 and the Red End Station 12. Only the phase comparison circuit 65 need be described in detail since the circuit 67 is identical thereto and performs in a manner which will become obvious after the description of the circuit 65 has been completed. The phase comparison circuit 65 is generally similar to that described and claimed in United States Patent No. 2,551,211 granted to James E. Hawkins and Beverly W. Koeppel and assigned to the same assignee as the present invention. Reference to the latter patent may be taken for a more detailed description of the operation of the individual components of the indicating equipment. Thus, the Green phase comparison circuit 65 comprises a phase discriminator and servo-circuit 82 including a servo-motor (not separately shown) having its output shaft connected through reduction gearing (also not separately shown) to drive the rotor of a control transformer or resolver forming part of the circuit 82. The rotor of the latter resolver is, in turn, connected, as indicated by the broken line 85, to drive a rotatable pointer 86 which forms part of the indicator 80. The pointer rotates over a circular face or scale having suitable graduations around its periphery to permit the indication of the phase relationship between the two audio frequency signals applied to the input terminals of the phase comparison circuit 65. One set of signal input terminals 82a of the phase discriminator and amplifier circuit 82 is supplied with 260 cycle reference signals passed through the bandpass filter 74 while a second set of signal input terminals 82b of this phase discriminator is excited by the 260 cycle beat or heterodyne signals passed through the filter 64. The circuit 82 operates in a manner described in Patent No. 2,551,211 to compare the phases of the two 260 cycle signals supplied to its two sets of input terminals, and to develop a D.C. control signal whenever the compared signals differ in phase. The polarity of the D.C. control signal depends upon the direction of the deviation while the amplitude of the signal, of course, depends upon the amount of the phase difference. This control signal it utilized in a manner which will be apparent to those skilled in this art to control the direction of drive of the servo-motor and the pointer 86.

As is described in the above-identified Patent No. 2,551,211, the control transformer or resolver of the circuit 82 includes a rotor winding and a pair of stator windings, the latter being displaced mechanically 90 degrees and being excited with excitation signals displaced 90 degrees in phase. The circuit is in the form of a balanced servo-loop and the pointer 86 cooperates with the graduated scale on the face of the indicator 80 to indicate the position of the mobile receiving unit 13 along one of the hyperbolic lines of the Green family. The indicating scale on the face provides a continuous reading from zero degrees to 360 degrees and, hence, one complete revolution of the pointer 86 during movement of the mobile craft carrying the receiving unit 13 indicates that a lane of the Green family has been traversed. The lanes of the Green family to which the indications on the indicator 80 pertain are spaced apart along the base line between the stations 10 and 11 by a distance equal to one-half wave length of the 2100 kilocycle position indicating channel and, since these lanes diverge on both sides of the base line, a greater distance must be traversed in other areas to cause a complete revolution of the pointer 86. The latter pointer is connected through mechanism not illustrated in the drawings to drive a set of integrating counters 88 which register the number of complete 360 degree revolutions of the pointer 86, thus providing a count to identify the Green lane within which the mobile receiving unit is located.

The phase comparison circuit 67 includes a phase discriminator and servo-circuit 90 having a resolver therein for driving a pointer 89 of the indicator 81 to identify the position of the mobile craft along one of the hyperbolic isophase lines of the Red family having foci at the stations 11 and 12 in order to provide a fine or accurate position indication. A set of integrating counters 92 count the number of lanes of the Red family traversed to identify the particular Red lane within which the mobile craft is located. Thus, in operation if the mobile receiving unit 13 enters the field of radiation of the transmitting units 11, 12, 13 and 14 at a known geographic location, the indicators 80 and 81 and their associated counters 88 and 92 may be initially set until the readings correspond to the known geographic location. The pointers of the indicators are driven in response to the received signals when the mobile craft is moved from the known geographic location.

As thus far described, the indicating equipment is similar to that disclosed in the above-identified Patent No. 2,551,211 and, hence, as long as the system remains in continuous operation following the start of the mobile receiving unit at the known geographic location, the pointers 80 and 81 and the revolution counters 88 and 92 function continuously to provide position information. To provide ambiguity resolution of the fine position indications of the Green system, in accordance with an important feature of the present invention, the rotor of the resolver in the circuit 82 is mechanically connected as indicated by the broken line 83 to drive the rotor of another resolver 84 while the rotor of the resolver in the circuit 90 is similarly connected to drive the rotor of a resolver 91. The stator windings of the resolver 84 are excited by 95 cycle signals which are displaced 90 degrees in phase as, for example, by using a phase shifting network not illustrated in the drawings, but forming part of the resolver circuit. The voltages induced in the rotor winding of the resolver 84 have a phase which depends both upon the phase of the 95 cycle stator excitation signals and upon the position of the rotor winding relative to the fixed stator windings. Thus, the 95 cycle output voltage from the resolver 84 derived from the rotor winding is supplied via a conductor 87 to the circuit 69 but this signal is phase shifted in accordance with the position of the rotor which is, in turn, a function of the phase relationship between the 260 cycle signals applied to the terminals 82a and 82b. The phase shifted 95 cycle signal appearing on the conductor 87 is applied to one set of input terminals 93a of a conventional galvanometer type null detector 93 which has its other input terminals 93b excited by the 95 cycle beat signals supplied to the circuit 69 from the band-pass filter 68. More specifically, the 95 cycle signals from the filter 68 are used to develop quadrature components for application to the stator windings of a resolver 94 identical to the device 84 described above. The output signals from the rotor winding of the resolver 94 are applied directly to the terminals 93b. The rotor of the resolver 94 is adapted to be turned manually by a hand operated crank 95 connected mechanically to the rotor through a connection represented by the broken line 96. The latter mechanical connection drives directly an indicator or pointer 97 movable over the face of a graduated scale or plate 98 for the purpose of indicating an angular position of the rotor of the resolver 94. When the two 95 cycle signals applied to the two sets of input terminals 93a and 93b are in phase the null detector circuit 93 provides a null or zero output to an associated galvanometer or meter 99. The null detector 93 is a discriminator type circuit for developing a D.C. control signal when the two input signals are not in phase, the magnitude of the control signal being a function of the amount of phase deviation and the polarity being a function of the direction of deviation.

Except for the frequencies of the audio signals, the lane identification circuit 71 associated with the Red system is identical to that for the Green system described above. Thus, the circuit 71 includes a resolver 100 having its stator windings excited by the 155 cycle signal from the filter 70 and having its rotor winding connected to one side of a null detector 101. The rotor of the resolver 100 is turned by a hand crank 102 acting through a mechanical connection 103 which also drives an indicator or fractional lane counter 104. The null detector 101 is also excited by 155 cycle signals derived from the rotor winding of a resolver 91 having its stator windings energized by 155 cycle reference signals from the filter 73. Since the rotor of the resolver 91 is driven by the Red comparison circuit 67, the output signal appearing on conductor 105 is phase shifted by an amount corresponding to the phase relationship between the 440 cycle signals passed by the filters 66 and 75. As before, the null detector 101 compares the phases of the 155 cycle signals supplied to its opposed input terminals and, if these two signals are not in phase, develops a D.C. output for driving a galvanometer or meter 106.

The circuits 69 and 71 are adapted to provide coarse and medium position indications for checking the accuracy of the integrating counters 88 and 92. Actually, if the system functions perfectly and without interruption the counters 88 and 92 will provide accurate lane counts for both the Red and Green systems but, in the event of an equipment failure either at one or more of the transmitting stations or at the mobile receiving unit, the signal drive to either or both of the phase comparison circuits 65 or 67 is interrupted and, as a consequence, the pointers and integrating counters of the non-excited circuit or circuits will maintain the positions occupied just prior to the interruption. The positions of the movable pointer or pointers and the associated counter or counters will thus remain fixed despite movement of the mobile craft within the radiation field of the transmitters during the interruption period and, hence, when the source of trouble has been located and repaired and when the system is restored to normal operation, the indications provided will no longer be accurate. More specifically, when the system operation is restored, the reference signals and the beat signals passed by the filters 64, 66, 74 and 75 will immediately excite the phase discriminator and servo-circuits 82 and 90 to drive the servo-motor in each circuit until the servo-loop is balanced whereupon the pointers 86 and 89 identify intersecting hyperbolic, isophase lines of the Green and Red families passing through the location of the mobile receiver unit. However, if the mobile receiving unit has traversed one or more full lanes of either or both families during the period of interruption of operation, the revolution counter or counters 88 and 92 no longer provide accurate lane counts.

In accordance with an important feature of the present invention, however, the ambiguity resolution circuits 69 and 71 may be used to respectively check the lane count of the counters 88 and 92. Thus, in order to check the lane counts, the operator makes both a coarse and a medium position check during the respective periods when the signals of the two ambiguity resolution channels are being radiated from the stations 10, 11 and 12. The operator is, of course, apprised as to which of the coarse or medium systems is in operation by the illumination of one or the other of the lights 77 and 78. Assuming first that the medium system is in operation, the slave gate circuit 76 renders the receiver 63 effective to receive the ambiguity resolution signals in the vicinity of 1900 kilocycles so that 95 and 155 cycle beat signals therebetween are produced in the manner described above. The latter signals are passed through the filters 68 and 70 respectively to the circuits 69 and 71 where they are respectively phase compared by the null detectors 93 and 101 with the 95 and 155 cycle reference signals reproduced by the receiver 62 and passed through the filters 72 and 73. If a direct measurement were made of the phase relationship between the 95 cycle reference signal from the filter 72 and the 95 cycle beat signal from the filter 68, an indication would be provided to identify the position of the mobile receiving unit relative to a set of hyperbolic isophase lines having foci at the stations 10 and 11. Similarly, a direct measurement of the phase relationship between the 155 cycle reference signal from the filter 73 and the 155 cycle beat signal from the filter 70 would identify the position of the mobile receiving unit relative to a set of hyperbolic isophase lines having foci at the stations 11 and 12. The isophase lines of both of the latter sets would be relatively close together since their spacing would be determined by the frequency of the ambiguity resolution channel near 1900 kilocycles. Since such a spacing is not greatly different than that between the isophase lines identified by the meters 80 and 81 the direct measurement of the phases of the two 95 cycle signals and of the two 155 cycle signals would be virtually useless in resolving ambiguity of the fine position indications. However, as was indicated above, in accordance with an important feature of the present invention the phase of one of the 95 cycle signals, for example, that of the reference signal from the filter 72 is shifted by the above-described action of the resolver 84 by an amount equal to the phase displacement between the two 260 cycle signals applied to the terminals 82a and 82b and, in a similar manner, the phase of one of the 155 cycle signals, for example, the reference signal from the filter 73 is shifted by an amount corresponding to the phase angle between the two 440 signals passed by the filters 66 and 75.

To understand the effect of this phase shift, consider only the operation of the Green system and assume that the mobile receiving unit starts at a position where the two 260 cycle signals applied to the terminals 82a and 82b are in phase so that the meter 80 erads zero while, at the same time, the two 95 cycle signals passed by the filters 68 and 72 are also in phase so that the meter 99 is nulled. As the mobile receiving unit 13 is moved in a direction to cut across the hyperbolic lines of the fine Green system the phase difference between signals applied to the terminals 82a and 82b will change at a faster rate than the phase difference between the signals at the output of the filters 68 and 72. This is due to the fact that the hyperbolic lines of the fine Green system are spaced as a function of the 2100 kilocycle frequency of the fine system channel and, hence, are somewhat closer together than the isophase lines of the 1900 kilocycle medium channel. More specifically, the lines of the fine system are crossed at a rate of 2100/1900=1.105 times the rate of crossing the lines of the 1900 kilocycle channel. Thus, by the time the mobile receiver has traversed a distance such that the signals at the output of the filters 68 and 72 are again in phase, it has, at the same time, crossed a full lane of the fine Green system plus a fraction of another lane. The amount of the fractional lane crossed is, of course, a function of the frequencies involved but in the example being described it is about 38 degrees.

Thus, when the mobile receiver has crossed one lane of the 1900 kilocycle system, the meter 80 will read 38 degrees and a phase shift of 38 degrees will be introduced into the 95 cycle reference signal passed by the filter 72. Therefore, even though the signals at the output of the filters 68 and 72 are in phase the meter 99 will not indicate a null. Instead, in order to null the two signals applied to the terminals 93a and 93b, it is necessary to shift the phase of the signal passed by the filter 68 by an amount equal to the phase shift introduced by the resolver 84. This is accomplished by turning the hand crank 95 by an amount sufficient to turn the rotor of the resolver 94 through an angle of 38 degrees so that the two signals applied to the terminals 93a and 93b of the null detector are again in phase. When the crank is turned the mechanical connection 96 drives the pointer 97 which cooperates with the scale 98 to indicate that a phase shift of 38 degrees was necessary to restore the balance between the 95 cycle signals.

If the mobile receiving unit 13 is moved from the zero or initial position through two lanes of the 1900 kilocycle system, a null between the 95 cycle signals is obtained by introducing a phase shift of 76 degrees by turning the crank 95 while movement through three such lanes will require a phase shift of 114 degrees and so on. If the 1900.000 kilocycle signals were radiated continuously and if the crank 95 were turned at a rate sufficient to maintain a continuous balance between the 95 cycle signals, the pointer 97 would be continuously driven at a rate corresponding to the rate of crossing hyperbolic isophase lines having foci at the stations 10 and 11 and spaced apart in accordance with a difference frequency of 200 kilocycles which may be termed a phantom frequency equal to the difference between the real frequencies of 2100 and 1900 kilocycles. The scale 98 and the pointer 97 thus provide a position indication identifying the location of the mobile receiving unit with respect to hyperbolic isophase lines having foci at the stations 10 and 11 and spaced apart in accordance with the 200 kilocycle difference frequency. In similar manner, the indicator 104 identifies the location of the mobile unit with respect to isophase lines having foci at the stations 11 and 12 and spaced apart in accordance with the 200 kilocycle difference frequency. These two indications may be referred to as medium or intermediate phase sensitivity indications since the rate at which they change in response to movement of the mobile unit is approximately one-tenth the rate of change of the high phase sensivity indications provided by the meters 80 and 81. To obtain an actual determination of the position of the mobile unit, the readings on the meters 80 and 81 and those on the meters 98 and 104 may be referred to a chart or nomograph of the area in which the unit 13 is being operated. The latter chart exhibits the isophase lines of both the fine and medium systems.

In operation, the readings on the meters 80 and 81 and the indications on the counters 88 and 92 will be used to establish the position of the mobile craft. The readings on the meters 98 and 104 are then used to determine whether the counters 88 and 92 are accurate. Thus, if the lane count on the counters 88 and 92 is incorrect, the lanes on the chart corresponding to these counts will not be consonant with the medium indications on the meters 98 and 104. If the lane count on either counter is five counts or less from the correct reading, the operator will be able to use the meter readings 98 and 104 to determine the exact position of the mobile craft whereupon the counters can be reset. However, if the counters are more than five counts off the operator will be unable to determine his position solely by reference to the indicators 98 and 104 because the readings provided by the latter are themselves ambiguous, that is, they repeat every 10.2 lanes of the fine system. In this connection, it should be observed that the null detectors 93 and 101 will provide a false null if the signals applied to their input terminals are more than 180 degrees out of phase. For example, assume that the mobile unit has moved from the zero position through six lanes of the 1900 kilocycle system to shift the 95 cycle reference signal by 6×38 or 228 degrees in such direction that the reference signal leads the 95 cycle beat signal. The null detector will show that the reference signal lags the beat nal by 360 degrees—228 degrees or 132 degrees thus indicating to the operator that the mobile craft has been moved through about four lanes of the 1900 kilocycle system to shift the reference signal in a negative or lagging direction. Thus, both of the null detectors are incapable of distiguishing phase shifts in excess of 180 degrees and, for this reason, the ambiguity resolution of the medium system is limited to 4.7 lanes of the 1900 kilocycle system or about 5 lanes of the fine system.

To permit the operator to check the counters 88 and 92 for errors in excess of five fine lanes, the coarse system is used. That is, when the transmitting stations 10, 11 and 12 are radiating ambiguity resolution signals in the vicinity of 2080 kilocycles, these signals are used in the manner described in detail above to produce 95 and 155 cycle reference signals at the outputs of the filters 72 and 73 and to produce 95 and 155 cycle beat signals at the outputs of the filters 68 and 70. The light 78, of course, informs the operator that the coarse system is in operation. The two 95 cycle signals are applied to the circuit 69 after phase shifting the reference signal in the manner previously described. The hand crank 95 is then adjusted until the two signals applied to the terminals 93a and 93b of the null detector are in phase to produce a null on the meter 99. The meter 98 then provides a coarse or low phase sensitivity position indication representing the location of the mobile craft relative to widely spaced hyperbolic, isophase lines having foci at the transmitting stations 10 and 11 and spaced apart in accordance with the 20 kilocycle difference between the 2100 kilocycle fine position indicating signals and 2080 kilocycle coarse ambiguity resolution signals. In similar manner, the two 155 cycle signals are passed to the circircuit 71 after phase shifting the reference signal and the hand crank 102 is adjusted to bring the two input signals to the null detector 101 into phase and, hence, to produce a null on the meter 106. The meter 104 then provides a coarse or low phase sensitivity indication representing the location of the mobile craft relative to widely spaced hyperbolic, isophase lines having foci at the stations 11 and 12, the spacing again being a function of the 20 kilocycle difference between the 2100 kilocycle position indicating signals and the 2080 kilocycle coarse ambiguity resolution signals.

As will be apparent from the foregoing description, the coarse indications provided by the meters 98 and 104 have a phase sensitivity which is only about one-tenth that of the medium indications and is about one-hundredth that of the fine position indications on the meters 80 and 81. The coarse indications, for reasons which will be obvious in view of the above description, will resolve ambiguities in the fine position indications within about 50 fine lanes and, as a result, if the operator at the mobile craft is able to determine his position within 50 lanes he can set the counters 88 and 92 to the proper lane count by using the coarse and medium indications in the manner described above. The approximation of the mobile craft position can be made in any manner well known in the art as, for example, by use of a rotatable directional antenna to provide nulls or peaks on signals from the stations 10, 11 and 12. Of course, the approximation could also be made by reference to a known geographic location such as a fixed buoy or in any other well known manner. The coarse and fine position indications by themselves may not be sufficient to provide an unambiguous position indication since the error in the coarse indications may be greater than one lane of the fine system. However, the medium position indications take care of this possibility by providing lane identification for the fine system while the coarse indications accurately identify the lane of the medium system and, as a consequence, accurate and unambiguous position indications may be provided within 50 lanes of the fine system.

Figure 4:
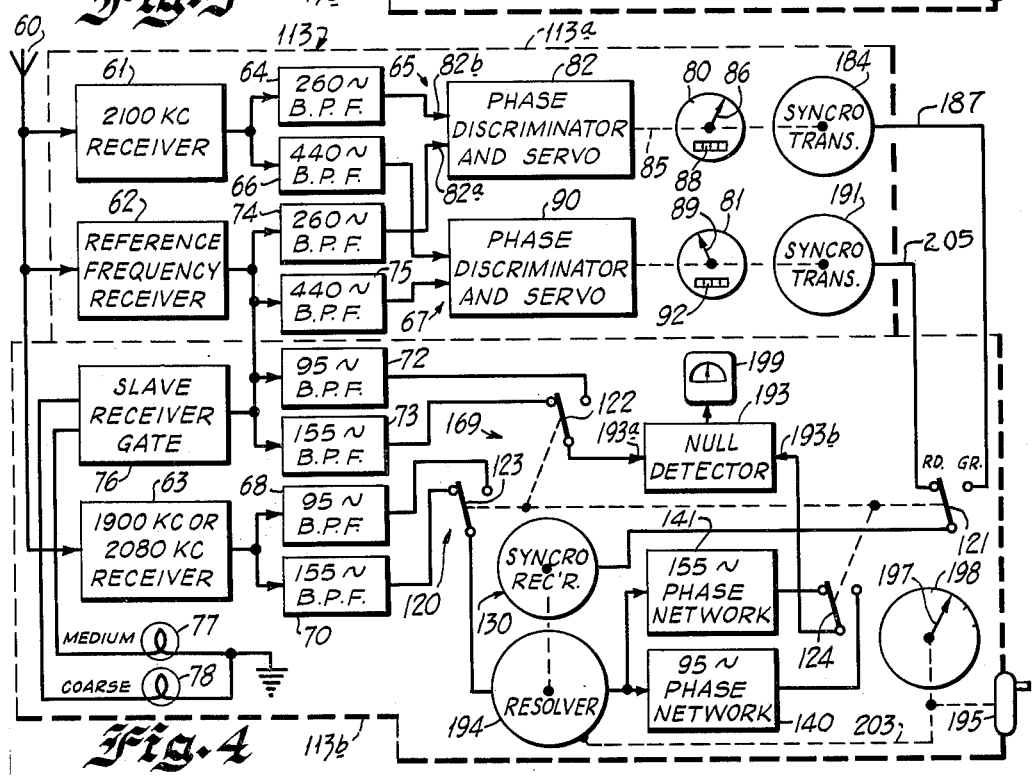
FIG. 4 is a diagrammatic representation of another embodiment of a mobile receiving unit which may be used with the transmitting system shown in FIG. 2 to provide position information.

FIG. 4 shows another mobile receiving unit 113 capable of use in the transmitting system shown in FIG. 2. The primary difference between the units shown in FIGS. 3 and 4 is the use in the latter of a single normally operated crank 195 for both the Green and Red lane identification circuits as compared with the use of separate mechanisms in the receiving unit 13 described above. Since many of the components of the mobile receiving unit 113 are identical to those used in the unit 13 these identical components have been assigned the same reference numerals and will not be described in detail. The existing mobile receiving equipment for providing the fine position indications has been enclosed within broken lines 113a and this equipment is essentially the same as that enclosed within the lines 13a in FIG. 3, the only difference being the connections of the output members or synchros. Thus, the output resolvers or synchro transmitters bear the numerals 184 and 191 and have their rotors driven from the servo-rotors of the circuits 82 and 90, respectively, in exactly the same manner as described above. The meters 80 and 81, therefore, function as previously described to provide fine or high phase sensitivity position indications. The stator windings of the synchro transmitters 184 and 191 are not excited by the reference signals from the filters 72 and 73 and in this respect they differ from the resolvers 84 and 91 described above. Instead, the rotor windings of the transmitters 184 and 191 are excited by a suitable A.C. signal such as a 60 cycle signal derived from the power supply. This A.C. signal induces in the stator windings an output signal of identical frequency but having a phase which is a function of the angular position occupied by the rotor of the synchro transmitter. The signals induced in the stators of the synchro transmitters 184 and 191 are respectively supplied to the lane identification circuit 169 via conductors 187 and 205.

The lane identification circuit 169 includes, in addition to the single crank 195 referred to above, a four section, two position, manually operated base line switch 120, a null detector 193 like the detector 93 described above, a meter 199, a synchro receiver 130, a resolver 194, an indicator 198, and a pair of phase networks 140 and 141 for the audio signals of 95 and 155 cycles, respectively. The switch 120 comprises four sections 121, 122, 123 and 124 having movable poles ganged together for operation in unison and movable to two different positions one of which may be referred to as the Green position and the other of which may be referred to as the Red position. The switch 120 is shown in FIG. 4 in the Red position wherein the section 121 is effective to supply A.C. signals from the conductor 205 to the stator windings of the synchro receiver 130. The synchro receiver cooperates with the resolver 194 to introduce into one of the beat signals a phase shift equal to the phase angle between the audio signals of the fine system. The phase shift introduced serves the same purpose as that provided by the resolvers 84 and 91 of the mobile receiving unit 13 previously described. More specifically, with the switch 120 in the Red position as shown in FIG. 4, the 155 cycle beat signal passed by the filter 70 is applied through the switch section 123 to the stator windings of the resolver 194. The rotor of this resolver is mechanically connected to the rotor of the synchro receiver 130. As will be understood by those familiar with the operation of servos or synchros the rotor of the synchro receiver 130 is driven by the A.C. signal applied to its stator windings until the rotor occupies an angular position identical to that of the rotor of the synchro transmitter 191. The rotor of the resolver 194, of course, occupies the same angular position as the rotor of the synchro receiver 130. The 155 cycle signal induced in the rotor winding of the resolver 194 is applied to the phase networks 140 and 141 but this signal is shifted in phase through an angle equal to that measured by the meter 81 which is, of course, a measure of the phase relationship between the 440 cycle signals passed by the filters 66 and 75 to the phase comparison circuit 67. Each network includes an adjustable phase shifting circuit for introducing a small phase shift to compensate for undesired phase shifts which occur as the audio signals pass through the components of the mobile receiving unit. Since the amount of these undesired phase shifts may differ for the 95 cycle and 155 cycle signals separate networks are necessary. In any event, with the switch 120 in the Red position, the 155 cycle signal from the resolver 194 passes through the network 141 and through the switch section 124 to the input terminals 193b of the null detector 193. The other set of input terminals 193a of the null detector is excited by the 155 cycle reference signal from the filter 73, this reference signal being supplied through the switch section 122. As was described in detail above in connection with the description of the detector 93 and its associated meter 99, a null or zero indication is provided on the meter 199 when the input signals to the terminals 193a and 193b are in phase but, when these signals are out of phase, the null detector produces a D.C. signal to deflect the meter position by an amount proportional to the magnitude of the phase deviation and in a direction indicative of the direction of the phase deviation. If the meter 199 indicates that the signals applied to the terminals 193a and 193b are not in phase, the operator at the mobile unit turns the crank 195 in a proper direction to shift the phase of the beat signal until the in-phase relationship is achieved. To this end, the crank is mechanically connected to the case of the resolver 194 as indicated by the broken line 203. Thus, when the crank is turned the resolver case carrying the stator windings is also turned to shift the phase of the 155 cycle beat signal supplied to the networks 140 and 141. The crank and its associated mechanical connection 203 also drive the pointer 197 of the indicator 198 so that the latter indicates the angular position of the crank.

In view of the foregoing description, it will be recognized that with the switch 120 in the Red position and with the transmitting stations radiating signals in the ambiguity resolution channel near 1900 kilocycles the crank 195 may be turned by the operator until a null is obtained on the meter 199 whereupon the indicator 198 provides a medium or intermediate phase sensitivity indication representing the location of the mobile craft relative to hyperbolic isophase lines having foci at the stations 11 and 12 and spaced apart in accordance with the 200 kilocycle phantom frequency difference between the 1900 kilocycle poistion indicating signals. Similarly, when the transmitting stations 10, 11 and 12 are radiating their coarse ambiguity resolution signals in the vicinity of 2080 kilocycles, the crank 195 may be turned to obtain a null on the meter 199 whereupon the indicator 198 provides a coarse or low phase sensitivity indication representing the location of the mobile craft relative to widely spaced hyperbolic isophase lines having foci at the stations 11 and 12 and spaced apart in accordance with the 20 kilocycle phantom frequency difference between the 2100 kilocycle fine position indicating signals and the 2080 kilocycle coarse ambiguity resolution signals. As is apparent from the above description, the medium and coarse position indications just described will provide a check on the accuracy of the counter 92 for the Red system indicator as long as the operator can determine his position within about 50 lanes of the fine Red system.

To check the accuracy of the counter 88 for the Green system, the operator throws the switch 120 to the Green position whereupon the switch section 121 supplies A.C. signals from the conductor 187 to the stator windings of the synchro receiver 130. The rotor of the synchro receiver is thus driven to an angular position identical with that of the rotor of the synchro transmitter 184. The switch section 122 supplies 95 cycle reference signals from the filter 72 to the terminal 193a of the null detector 193 and the switch section 123 supplies 95 cycle beat signals from the filter 68 to the stator windings of the resolver 194. The 95 cycle signals induced in the rotor winding of the latter resolver are passed through the network 140 and through the switch section 124 to the terminals 193b of the null detector. The latter 95 cycle signals are, of course, phase shifted in the resolver 194 by an amount equal to the angular position of the pointer 86 of the Green system indicator 80.

To obtain a medium Green position indication with the stations 10, 11 and 12 radiating ambiguity resolution signals in the vicinity of 1900 kilocycles, the operator tuurns the crank 195 until the meter 199 indicates a null whereupon the indicator 198 provides a medium phase sensitivity position indication representing the location of the mobile craft relative to hyperbolic isophase lines having foci at the stations 10 and 11 and spaced apart in accordance with the 200 kilocycle phantom frequency difference between the 2100 kilocycle position indicating signals and the 1900 kilocycle medium ambiguity resolution signals. A coarse position indication for the Green system is obtained in an obvious manner when the transmitting stations 10, 11 and 12 are effective to radiate their coarse ambiguity resolution signals in the vicinity of 2080 kilocycles. The medium and coarse indications for the Green system are referred to a computer, chart or nomograph to check the lane count on the counters 88. If the operator can determine fine position within 50 lanes of the fine Green system the medium and coarse position indications will enable an accurate determination of the correctness of the Green system counter.

Figure 5:
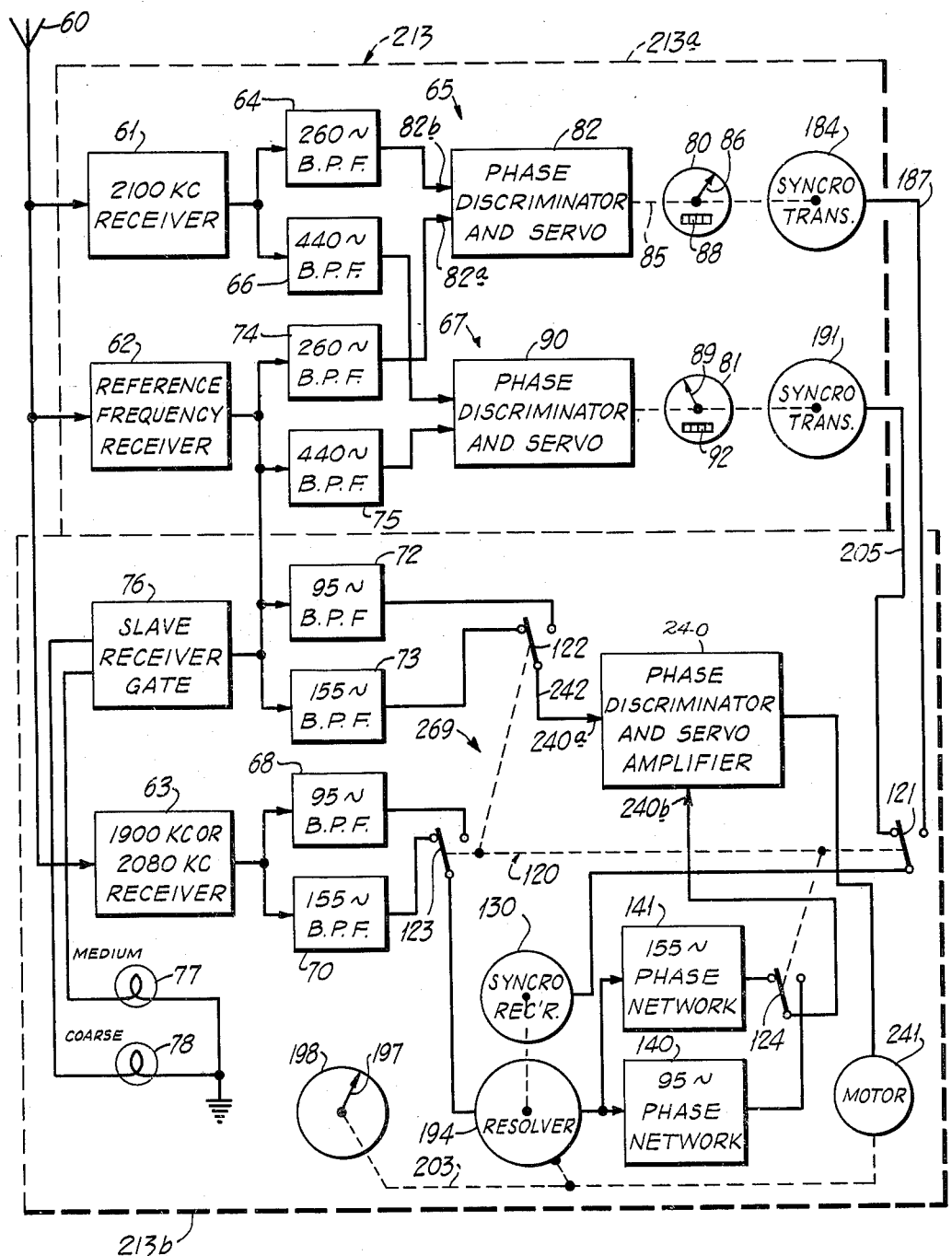
FIG. 5 is a diagrammatic representation of a further embodiment of a mobile receiving unit for use with the transmitting system shown in FIG. 2.

FIG. 5 illustrates still another form of mobile receiving unit 213 which may be used with the transmitting system of FIG. 2. The receiving unit 213 differs from the unit 113 principally in the provision of means in the lane identification facilities 213b for automatically shifting the phases of the lane identification beat signals without resort to a manually operated crank or the like. Essentially, this is acomplished by replacing the null detector 193, the associated meter 199 and the hand crank 195 with a servo-mechanism including a phase discriminator and servo-amplifier circuit 240 and a servo-motor 241 for driving the mechanical connection 203 to the case of the resolver 194. Since most of the components of the mobile receiving unit 213 are identical to those of the unit 113 described above, identical reference numerals have again been used to avoid the necessity for detailed description of these components.

To accomplish the aforementioned automatic phase shifting of the 95 and 155 cycle beat signals from the filters 68 and 70, one set of input terminals 240a of the servo-amplifier circuit 240 is excited by reference signals supplied via a conductor 242 from section 122 of the base line selector switch 120 while the other set of input terminals 240b is supplied with beat signals from the switch section 124. Signals of identical frequency are, of course, supplied to the circuit 240 since the switch 120 will select either 95 cycle or 155 cycle signals depending upon whether the Green system or Red system counters are to be checked. The circuit 240 is similar to the circuit 82 described above and functions to provide a D.C. output signal to the servo-motor 241 whenever the two input signals are out of phase. The amplitude of the D.C. signal supplied to the motor 241 is a function of the magnitude of the phase difference between the input signals while the polarity of the signal is a function of the direction of the phase deviation. The motor 241 acts through the drive correction 203 to turn the case of the resolver 194 and its stator windings, thus shifting the phase of the beat signal otuput from the resolver in a direction to bring it into phase with the reference signal applied to the input terminals 240a. The servo system is, thus, in the form of a conventional balanced loop.

and when the two input signals to the circuit 240 are in phase no drive signal is supplied to the motor 241.

To check the accuracy of the counter 92 for the Red system the operator places the switch 120 in the Red position shown in FIG. 5 whereupon A.C. signals from the synchro transmitter 191 are applied to the synchro receiver 130 to drive both the rotor of the receiver and that of the resolver 194 to a position corresponding to that of the pointer 86 of the Red system meter 81. The stator windings of the resolver 194 receive 155 cycle beat signals from the filter 70 through the switch section 123 and these signals, after undergoing a phase shift equal to the angle of the pointer 86, are applied through the network 141 and through the switch section 124 to the terminals 240b of phase discriminator and servo-amplifier circuit 240. The input terminals 240a of the latter circuit receive 155 cycle reference signals from the filter 73 through the switch section 122. If the two 155 cycle input signals to the circuit 240 are not in phase the servo-motor 241 is immediately driven in a direction to turn the case of the resolver 194 until the in-phase condition is reached. The pointer 197 is driven to indicate the position of the output shaft of the servo-motor. In view of the foregoing description, it will be obvious that a medium position indication for the Red system is provided by the meter 198 when the transmitting stations 10, 11 and 12 are effective to radiate the medium ambiguity resolution signals in the vicinity of 1900 kilocycles while a coarse indication is provided when the coarse ambiguity resolution signals near 2080 kilocycles are being radiated. As was indicated above, the Red system counter can be accurately checked by resort to the medium and coarse position indications as long as the position of the craft can be determined within 50 lanes.

To check the accuracy of the counter 88 for the Green system, the switch 120 is thrown to the Green position whereupon coarse and medium position indications for the Green system will be automatically obtained in a manner which is obvious from the above description. Both the Red and Green medium and coarse position indications are produced with a minimum time and effort on the part of the operator since the operator is required only to manipulate the switch 120 and to transfer the readings on the indicator 198 to the chart or nomograph.

In view of the foregoing description, it will be recognized that the systems described are effective to perform the enumerated objects of the invention. The transmitting facilities may be utilized with any number of mobile receiving units and, in the event that some of these units are of the type presently in use and not equipped with an ambiguity resolution system like that described, the latter units will, nevertheless, be effective to provide the fine position indications although obviously no means will be provided for checking the lane counts appearing on their integrating counters.

While particular embodiments of the invention have been illustrated and described, it will be recognized that many modifications will readily occur to those skilled in this art and it is therefore contemplated by the appended claims to cover any such modifications as fall within the true spirit and scope of the invention.

What is claimed as new and desired to be secured by Letters Patent of the United States is:

1. In a transmitting system for use in a three foci hyperbolic, continuous wave, position finding system, first, second and third fixed transmitting stations each continuously radiating a position indicating signal with said position indicating signals differing from each other in frequency but falling within a first frequency channel, means at each of said fixed stations for alternately radiating first and second ambiguity resolution signals, the first ambiguity resolution signals radiated from the three fixed stations differing in frequency from each other but lying within a second frequency channel which is distinguishable from the first frequency channel, the second ambiguity resolution signals radiated from the three fixed stations also differing from each other but lying within a third frequency channel which is distinguishable from the first and second channels, the frequency difference between the first ambiguity resolution signals radiated from the first and second stations being equal to the frequency difference between the second ambiguity resolution signals radiated from the first and second stations and the frequency difference between the first ambiguity resolution signals radiated from the second and third stations being equal to the frequency difference between the second ambiguity resolution signals radiated from the second and third stations, a reference transmitting station radiating a carrier wave having a frequency distinguishable from said first, second and third frequency channels, means for coding the carrier wave radiated from said reference station, means at each of said fixed transmitting stations for receiving the coded carrier wave and for developing therefrom a control signal, means at each of said fixed transmitting stations responsive to the control signal for rendering each of the latter stations alternately effective to radiate its two ambiguity resolution signals, with said three fixed stations being rendered effective to radiate simultaneously the ambiguity resolution signals of the second channel during a first interval and to radiate simultaneously the ambiguity resolution signals of the third channel during a second interval, first receiving means at the reference station for receiving the position indicating signals radiated from all three fixed stations, second receiving means at the reference station for receiving the ambiguity resolution signals in said second and third frequency channels, means for rendering said second receiving means effective to receive the ambiguity resolution signals of the second channel during the first of said intervals and for rendering the second receiving means effective to receive the signals of the third channel during the second interval, said second receiving means being effective to heterodyne the ambiguity resolution signals of the second channel in pairs during the first interval in order to develop a first difference signal from the first ambiguity resolution signals radiated from the first and second stations and to develop a second difference signal from the first ambiguity resolution signals radiated from the second and third stations, said second receiving means also being effective to heterodyne the ambiguity resolution signals of the third channel in pairs during the second interval in order to develop a third difference signal from the second ambiguity resolution signals radiated from the first and second stations and to develop a fourth difference signal from the second ambiguity resolution signals radiated from the second and third stations, said first receiving means being effective to heterodyne the position indicating signals in pairs in order to develop a fifth difference signal from the position indicating signals radiated from the first and second stations and to develop a sixth difference signal from the position indicating signals radiated from the second and third stations, and means for modulating said carrier wave with reference signals respectively derived from said first, second, third, fourth, fifth and sixth difference signals.

2. In a transmitting system for use in a three foci hyperbolic, continuous wave, position finding system, first, second and third fixed transmitting stations each continuously radiating a position indicating signal with said position indicating signals differing from each other in frequency but falling within a first frequency channel, means at each of said fixed stations for alternately radiating first and second ambiguity resolution signals, the first ambiguity resolution signals radiated from the three fixed stations differing in frequency from each other but lying within a second frequency channel which is distinguishable from the first frequency channel, the second ambiguity resolution signals radiated from the three fixed stations also differing from each other but lying within a third frequency channel which is distinguishable from the first and second channels, the frequency difference between the first ambiguity resolution signals radiated from the first and second stations being equal to the frequency difference between the second ambiguity resolution signals radiated from the first and second stations and the frequency difference between the first ambiguity resolution signals radiated from the second and third stations being equal to the frequency difference between the second ambiguity resolution signals radiated from the second and third stations, a reference transmitting station radiating a carrier wave having a frequency distinguishable from said first, second and third frequency channels, means for coding the carrier wave radiated from said reference station, means at each of said fixed transmitting stations for receiving the coded carrier wave and for developing therefrom a control signal, means at each of said fixed transmitting stations responsive to the control signal for rendering each of the latter stations alternately effective to radiate its two ambiguity resolution signals, with said three fixed stations being rendered effective to radiate simultaneously the ambiguity resolution signals of the second channel during a first interval and to radiate simultaneously the ambiguity resolution signals of the third channel during a second interval, receiving means at the reference station for receiving the position indicating signals radiated from all three fixed stations and for receiving the ambiguity resolution signals in said second and third frequency channels, said receiving means being effective to heterodyne the ambiguity resolution signals of the second channel in pairs during the first interval in order to develop a first difference signal from the first ambiguity resolution signals radiated from the first and second stations and to develop a second difference signal from the first ambiguity resolution signals radiated from the second and third stations, said receiving means also being effective to heterodyne the ambiguity resolution signals of the third channel in pairs during the second interval in order to develop a third difference signal from the second ambiguity resolution signals radiated from the first and second stations and to develop a fourth difference signal from the second ambiguity resolution signals radiated from the second and third stations, said receiving means being effective to heterodyne the position indicating signals in pairs in order to develop a fifth difference signal from the position indicating signals radiated from the first and second stations and to develop a sixth difference signal from the position indicating signals radiated from the second and third stations, and means for modulating said carrier wave with reference signals respectively derived from said first, second, third, fourth, fifth and sixth difference signals.

3. In a transmitting system for use in a three foci hyperbolic, continuous wave, position finding system, first, second and third fixed transmitting stations each continuously radiating a position indicating signal with said position indicating signals differing from each other in frequency but falling within a first frequency channel, means at each of said fixed stations for alternately radiating first and second ambiguity resolution signals, the first ambiguity resolution signals radiated from the three fixed stations differing in frequency from each other but lying within a second frequency channel which is distinguishable from the first frequency channel, the second ambiguity resolution signals radiated from the three fixed stations also differing from each other but lying within a third frequency channel which is distinguishable from the first and second channels, said three fixed stations being rendered effective to radiate simultaneously the ambiguity resolution signals of the second channel during a first interval and to radiate simultaneously the ambiguity resolution signals of the third channel during a second interval, the frequency difference between the first ambiguity resolution signals radiated from the first and second stations being equal to the frequency difference between the second ambiguity resolution signals radiated from the first and second stations and the frequency difference between the first ambiguity resolution signals radiated from the second and third stations being equal to the frequency difference between the second ambiguity resolution signals radiated from the second and third stations, a reference transmitting station radiating a carrier wave having a frequency distinguishable from said first, second and third frequency channels, first receiving means at the reference station for receiving the position indicating signals radiated from all three fixed stations, second receiving means at the reference station for receiving the ambiguity resolution signals in said second and third frequency channels, means for rendering said second receiving means effective to receive the ambiguity resolution signals of the second channel during the first of said intervals and for rendering the second receiving means effective to receive the signals of the third channel during the second interval, said second receiving means being effective to heterodyne the ambiguity resolution signals of the second channel in pairs during the first interval in order to develop a first difference signal from the first ambiguity resolution signals radiated from the first and second stations and to develop a second difference signal from the first ambiguity resolution signals radiated from the second and third stations, said second receiving means also being effective to heterodyne the ambiguity resolution signals of the third channel in pairs during the second interval in order to develop a third difference signal from the second ambiguity resolution signals radiated from the first and second stations and to develop a fourth difference signal from the second ambiguity resolution signals radiated from the second and third stations, said first receiving means being effective to heterodyne the position indicating signals in pairs in order to develop a fifth difference signal from the position indicating signals radiated from the first and second stations and to develop a sixth difference signal from the position indicating signals radiated from the second and third stations, and means for modulating said carrier wave with reference signals respectively derived from said first, second, third, fourth, fifth and sixth difference signals.

4. In a transmitting system for use in a three foci hyperbolic, continuous wave, position finding system, first, second and third fixed transmitting stations each continuously radiating a position indicating signal with said position indicating signals differing from each other in frequency but falling within a first frequency channel, means at each of said fixed stations for alternately radiating first and second ambiguity resolution signals, the first ambiguity resolution signals radiated from the three fixed stations differing in freqeuncy from each other but lying within a second frequency channel which is distinguishable from the first frequency channel, the second ambiguity resolution signals radiated from the three fixed stations differing in frequency from each other but lying a third frequency channel which is distinguishable from the first and second channels, said three fixed stations being rendered effective to radiate simultaneously the ambiguity resolution signals of the second channel during a first interval and to radiate simultaneously the ambiguity resolution signals of the third channel during a second interval, the frequency difference between the first ambiguity resolution signals radiated from the first and second stations being equal to the frequency difference between the second ambiguity resolution signals radiated from the first and second sections and the frequency difference between the first ambiguity resolution signals radiated from the second and third stations being equal to the frequency difference between the second ambiguity resolution signals radiated from the second and third stations, a reference transmitting station radiating a carrier wave having a frequency distinguishable from said first, second and third frequency channels, receiving means at the reference station for receiving the position indicating signals radiated from all three fixed stations and for receiving the ambiguity resolution signals in said second and third frequency channels, said receiving means being effective to heterodyne the ambiguity resolution signals of the second channel in pairs during the first interval in order to develop a first difference signal from the first ambiguity resolution signals radiated from the first and second stations and to develop a second difference signal from the first ambiguity resolution signals radiated from the second and third stations, said receiving means also being effective to heterodyne the ambiguity resolution signals of the third channel in pairs during the second interval in order to develop a third difference signal from the second ambiguity resolution signals radiated from the first and second stations and to develop a fourth difference signal from the second ambiguity resolution signals radiated from the second and third stations, said receiving means also being effective to heterodyne the position indicating signals in pairs in order to develop a fifth difference signal from the position indicating signals radiated from the first and second stations and to develop a sixth difference signal from the position indicating signals radiated from the second and third stations, and means for modulating said carrier wave with reference signals respectively derived from said first, second, third, fourth, fifth and sixth difference signals.

5. In a transmitting system for use in a three foci hyperbolic, continuous wave, position finding system, first, second and third fixed transmitting stations each continuously radiating a position indicating signal with said position indicating signals differeing from each other in frequency but falling within a first frequency channel, means at each of said fixed stations for alternately radiating first and second ambiguity resolution signals, the first ambiguity resolution signals radiated from the three fixed stations differing in frequency from each other but lying within a second frequency channel which is distinguishable from the first frequency channel, the second ambiguity resolutions signals radiated from the three fixed stations also differing from each other but lying within a third frequency channel which is distinguishable from the first and second channels, a reference transmitting station radiating a carrier wave having a frequency distinguishable from said first, second and third frequency channels, means for coding the carrier wave radiated from said reference station, means at each of said fixed transmitting stations for receiving the coded carrier wave and for developing therefrom a control signal, means at each of said fixed transmitting stations responsive to the control signal for rendering each of the latter stations alternately effective to radiate its two ambiguity resolution signals, with said three fixed stations being rendered effective to radiate simultaneously the ambiguity resolution signals of the second channel during a first interval and to radiate simultaneously the ambiguity resolution signals of the third channel during a second interval, first receiving means at the reference station for receiving the position indicating signals radiated from all three fixed stations, second receiving means at the reference station for receiving the ambiguity resolution signals in said second and third frequency channels, means for rendering said second receiving means effective to receive the ambiguity resolution signals of the second channel during the first of said intervals and for rendering the second receiving means effective to receive the signals of the third channel during the second interval, said second receiving means being effective to heterodyne the ambiguity resolution signals of the second channel in pairs during the first interval in order to develop a first difference signal from the first ambiguity resolution signals radiated from the first and second stations and to develop a second difference signal from the first ambiguity resolution signals radiated from the second and third stations, said second receiving means also being effective to heterodyne the ambiguity resolution signals of the third channel in pairs during the second interval in order to develop a third difference signal from the second ambiguity resolution signals radiated from the first and second stations and to develop a fourth difference signal from the second ambiguity resolution signals radiated from the second and third stations, said first receiving means being effective to heterodyne the position indicating signals in pairs in order to develop a fifth difference signal from the position indicating signals radiated from the first and second stations and to develop a sixth difference signal from the position indicating signals radiated from the second and third stations, and means for modulating said carrier wave with reference signals respectively derived from said first, second, third, fourth, fifth and sixth difference signals.

6. In a transmitting system for use in a three foci hyperbolic, continuous wave, position finding system, first, second and third fixed transmitting stations each continuously radiating a position indicating signal with said position indicating signals differing from each other in frequency but falling within a first frequency channel, means at each of said fixed stations for alternately radiating first and second ambiguity resolution signals, the first ambiguity resolution signals radiated from the three fixed stations differing in frequency from each other but lying within a second frequency channel which is distinguishable from the first frequency channel, the second ambiguity resolution signals radiated from the three fixed stations also differing from each other but lying within a third frequency channel which is distinguishable from the first and second channels, said three fixed stations being rendered effective to radiate simultaneously the ambiguity resolution signals of the second channel during a first interval and to radiate simultaneously the ambiguity resolution signals of the third channel during a second interval, a reference transmitting station radiating additional signals, first receiving means at the reference station for receiving the position indicating signals radiated from all three fixed stations, second receiving means at the reference station for receiving the ambiguity resolution signals in said second and third frequency channels, means for rendering said second receiving means effective to receive the ambiguity resolution signals of the second channel during the first of said intervals and for rendering the second receiving means effective to receive the signals of the third channel during the second interval, said second receiving means being effective to heterodyne the ambiguity resolution signals of the second channel in pairs during the first interval in order to develop a first difference signal from the first ambiguity resolution signals radiated from the first and second stations and to develop a second difference signal from the first ambiguity resolution signals radiated from the second and third stations, said second receiving means also being effective to heterodyne the ambiguity resolution signals of the third channel in pairs during the second interval in order to develop a third difference signal from the second ambiguity resolution signals radiated from the first and second stations and to develop a fourth difference signal from the second ambiguity resolution signals radiated from the second and third stations, said first receiving means being effective to heterodyne the position indicating signals in pairs in order to develop a fifth difference signal from the position indicating signals radiated from the first and second stations and to develop a sixth difference signal from the position indicating signals radiated from the second and third stations, and means for modulating said additional signals with reference signals respectively derived from said first, second, third, fourth, fifth and sixth difference signals.

7. In a transmitting system for use in a two foci hyperbolic, continuous wave, location system, first and second fixed transmitting stations each continuously radiating a position indicating signal with said position indicating signals differing from each other in frequency but falling within a first frequency channel, means at each of said fixed stations for radiating first and second ambiguity resolution signals alternately with each other, the first ambiguity resolution signals radiated from the two fixed stations differing from each other in frequency but falling within a second frequency channel, the second ambiguity resolution signals radiated from the two fixed stations also differing from each other in frequency but falling within a third frequency channel, the frequency difference between the two ambiguity resolution signals of the second channel being equal to that between the two ambiguity resolution signals of the third channel, a reference transmitting station spaced from said first and second stations for radiating a carrier wave having a frequency distinguishable from all of said first, second and third frequency channels, means for coding the carrier wave radiated from said reference station, means at each of said fixed transmitting stations for receiving the coded carrier wave and producing therefrom a control signal, means at each of said fixed transmitting stations responsive to the control signal for rendering each of the latter stations alternately effective to radiate the two ambiguity resolution signals with the ambiguity resolution signals of the second channel being radiated simultaneously from said first and second stations during a first interval and with the ambiguity resolution signals of the third channel also being radiated simultaneously from the first and second stations during a second interval, first receiving means at the reference station for receiving the position indicating signals radiated from both of the fixed stations, second receiving means at the reference station for receiving the signals of both of said second and third channels, means for rendering said second receiving means effective to receive the signals of the second channel during the first interval and for rendering the second receiving means effective to receive the signals of the third channel during the second interval, said second receiving means being effective during the first interval to heterodyne the ambiguity resolution signals of the second channel in order to develop a first difference signal and also effective during the second interval to heterodyne the ambiguity resolution signals of the third channel to develop a second difference signal, said first receiving means being effective to heterodyne the position indicating signals to develop a third difference signal, and means for modulating said carrier wave with reference signals respectively derived from said first, second and third difference signals.

8. In a transmitting system for use in a two foci hyperbolic, continuous wave, location system, first and second fixed transmitting stations each continuously radiating a position indicating signal with said position indicating signals differing from each other in frequency but falling within a first frequency channel, means at each of said fixed stations for radiating first and second ambiguity resolution signals alternately with each other, the first ambiguity resolution signals radiated from the two fixed stations differing from each other in frequency but falling within a second frequency channel, the second ambiguity resolution signals radiated from the two fixed stations also differing from each other in frequency but falling within a third frequency channel, the frequency difference between the two ambiguity resolution signals of the second channel being equal to that between the two ambiguity resolution signals of the third channel, a reference transmitting station spaced from said first and second stations for radiating a carrier wave having a frequency distinguishable from all of said first, second and third frequency channels, means for coding the carrier wave radiated from said reference station, means at each of said fixed transmitting stations for receiving the coded carrier wave and producing therefrom a control signal, means at each of said fixed transmitting stations responsive to the control signal for rendering each of the latter stations alternately effective to radiate the two ambiguity resolution signals with the ambiguity resolution signals of the second channel being radiated simultaneously from said first and second stations during a first interval and with the ambiguity resolution signals of the third channel also being radiated simultaneously from the first and second stations during a second interval, receiving means at the reference station for receiving the position indicating signals radiated from both of the fixed stations and for receiving the signals for both of said second and third channels, said receiving means being effective to heterodyne the ambiguity resolution signals of the second channel in order to develop a first difference signal to heterodyne the ambiguity resolution signals of the third channel to develop a second difference signal and to heterodyne the position indicating signals to develop a third difference signal, and means for modulating said carrier wave with reference signals respectively derived from said first, second and third difference signals.

9. In a transmitting system for use in a two foci hyperbolic, continuous wave, location system, first and second fixed transmitting stations each continuously radiating a position indicating signal with said position indicating signals differing from each other in frequency but falling within a first frequency channel, means at each of said fixed stations for radiating first and second ambiguity resolution signals altrenately with each other, the first ambiguity resolution signals radiated from the two fixed stations differing from each other in frequency but falling within a second frequency channel, the second ambiguity resolution signals radiated from the two fixed stations also differing from each other in frequency but falling within a third frequency channel, a reference transmitting station spaced from said first and second stations for radiating additional signals, means for coding the additional signals radiated from said reference station, means at each of said fixed transmitting stations for receiving the coded additional signals and producing therefrom a control signal, means at each of said fixed transmitting stations responsive to the control signal for rendering each of the latter stations alternately effective to radiate the two ambiguity resolution signals with the ambiguity resolution signals of the second channel being radiated simultaneously from said first and second stations during a first interval and with the ambiguity resolution signals of the third channel also being radiated simultaneously from the first and second stations during a second interval, receiving means at the reference station for receiving the position indicating signals radiated from both of the fixed stations and for receiving the signals of both of said second and third channels, said receiving means being effective to heterodyne the ambiguity resolution signals of the second channel in order to develop a first difference signal, to heterodyne the ambiguity resolution signals of the third channel to develop a second difference signal to heterodyne the position indicating signals to develop a third difference signal, and means for modulating said additional signals with reference signals respectively derived from said first, second and third difference signals.

10. In a transmitting system for use in a two foci hyperbolic, continuous wave, location system, first and second fixed transmitting stations each continuously radiating a position indicating signal with said position indicating signals differing from each other in frequency but falling within a first frequency channel, means at each of said fixed stations for radiating first and second ambiguity resolution signals alternately with each other, the first ambiguity resolution signals radiated from the two fixed stations differing from each other in frequency but falling within a second frequency channel, the second ambiguity resolution signals radiated from the two fixed stations also differing from each other in frequency but falling within a third frequency channel, the ambiguity resolution signals of the second channel being radiated simultaneously from said first and second stations during a first interval and the ambiguity resolution signals of the third channel also being radiated simultaneously from the first and second stations during a second interval, the frequency difference between the two ambiguity resolution signals of the second channel being equal to that between the two ambiguity resolution signals of the third channel, a reference transmitting station radiating a carrier wave having a frequency distinguishable from all of said first, second and third frequency channels, first receiving means at the reference station for receiving the position indicating signals radiated from both of the fixed stations, second receiving means at the reference station for receiving the signals of both of said second and third channels, means for rendering said second receiving means effective to receive the signals of the second channel during the first interval and for rendering the second receiving means effective to receive the signals of the third channel during the second interval, said second receiving means being effective during the first interval to heterodyne the ambiguity resolution signals of the second channel in order to develop a first difference signal and also effective during the second interval to heterodyne the ambiguity resolution signals of the third channel to develop a second difference signal, said first receiving means being effective to heterodyne the position indicating signals to develop a third difference signal, and means for modulating said carrier wave with reference signals respectively derived from said first, second and third difference signals.

11. In a transmitting system for use in a two foci hyperbolic, continuous wave, location system, first and second fixed transmitting stations each continuously radiating a position indicating signal with said position indicating signals differing from each other in frequency but falling within a first frequency channel, means at each of said fixed stations for radiating first and second ambiguity resolution signals alternately with each other, the first ambiguity resolution signals radiated from the two fixed stations differing from each other in frequency but falling within a second frequency channel, the second ambiguity resolution signals radiated from the two fixed stations also differing from each other in frequency but falling within a third frequency channel, the ambiguity resolution signals of the second channel being radiated simultaneously from said first and second stations during a first interval and the ambiguity resolution signals of the third channel also being radiated simultaneously from the first and second stations during a second interval, a reference transmitting station radiating additional signals, first receiving means at the reference station for receiving the position indicating signals radiated from both of the fixed stations, second receiving means at the reference station for receiving the signals of both of said second and third channels, means for rendering said second receiving means effective to receive the signals of the second channel during the first interval and for rendering the second receiving means effective to receive the signals of the third channel during the second interval, said second receiving means being effective during the first interval to heterodyne the ambiguity resolution signals of the second channel in order to develop a first difference signal and also effective during the second interval to heterodyne the ambiguity resolution signals of the third channel to develop a second difference signal, said first receiving means being effective to heterodyne the position indicating signals to develop a third difference signal, and means for modulating said additional signals radiated from the reference station with reference signals respectively derived from said first, second and third difference signals.

12. In a transmitting system for use in a two foci hyperbolic, continuous wave, location system, first and second fixed transmitting stations each continuously radiating a position indicating signal with said position indicating signals differing from each other in frequency but falling within a first frequency channel, means at each of said fixed stations for radiating first and second ambiguity resolution signals alternately with each other, the first ambiguity resolution signals radiated from the two fixed stations differing from each other in frequency but falling within a second frequency channel, the second ambiguity resolution signals radiated from the two fixed stations also differing from each other in frequency but falling within a third frequency channel, the ambiguity resolution signals of the second channel being radiated simultaneously from said first and second stations during a first interval and the ambiguity resolution signals of the third channel also being radiated simultaneously from the first and second stations during a second interval, the frequency difference between the two ambiguity resolution signals of the second channel being equal to that between the two ambiguity resolution signals of the third channel, a reference transmitting station radiating a carrier wave having a frequency distinguishable from all of said first, second and third frequency channels, receiving means at the reference station for receiving the position indicating signals radiated from both of the fixed stations and for receiving the signals of both of said second and third channels, said receiving means being effective to heterodyne the ambiguity resolution signals of the second channel in order to develop a first difference signal, to heterodyne the ambiguity resolution signals of the third channel to develop a second difference signal, and to heterodyne the position indicating signals to develop a third difference signal, and means for modulating said carrier wave with reference signals respectively derived from said first, second and third difference signals.

13. In a transmitting system for use in a two foci hyperbolic, continuous wave, location system, first and second fixed transmitting stations each continuously radiating a position indicating signal with said position indicating signals differing from each other in frequency but falling within a first frequency channel, means at each of said fixed stations for radiating first and second ambiguity resolution signals alternately with each other, the first ambiguity resolution signals radiated from the two fixed stations differing from each other in frequency but falling within a second frequency channel, the second ambiguity resolution signals radiated from the two fixed stations also differing from each other in frequency but falling within a third frequency channel, the ambiguity resolution signals of the second channel being radiated simultaneously from said first and second stations during a first interval and the ambiguity resolution signals of the third channel also being radiated simultaneously from the first and second stations during a second interval, the frequency difference between the two ambiguity resolution signals of the second channel being equal to that between the two ambiguity resolution signals of the third channel, a reference transmitting station for radiating additional signals, first receiving means at the reference station for receiving the position indicating signals radiated from both of the fixed stations and for receiving the signals of both of said second and third channels, said receiving means being effective to heterodyne the ambiguity resolution signals of the second channel in order to develop a first difference signal, to heterodyne the ambiguity resolution signals of the third channel to develop a second difference signal, and the position indicating signals to develop a third difference signal, and means for modulating the additional signals radiated from the reference station with reference signals respectively derived from said first, second and third difference signals.

14. Mobile receiving equipment for use in radio location systems of the hyperbolic, continuous wave type radiating from spaced points at least two position indicating signals and at least two ambiguity resolution signals, said position indicating signals differing from each other in frequency but falling within a first channel, said ambiguity resolution signals also differing from each other but falling within a second channel distinguishable from the first channel, said system being of the type wherein the position indicating signals are heterodyned at a fixed point in the system to develop a first difference frequency while the ambiguity resolution signals are similarly heterodyned to develop a second difference frequency and wherein said first and second difference frequencies are respectively used to produce first and second reference signals modulated upon at least one carrier wave, said mobile receiving equipment comprising means for receiving all of said signals to detect the first and second reference signals, to heterodyne the position indicating signals to develop a first beat frequency and to heterodyne the ambiguity resolution signals to develop a second beat frequency, means for comparing the phase of the first beat frequency with that of the first reference signal to develop a first position indication accurately representing the location of the mobile receiving equipment relative to a first set of hyperbolic isophase lines having foci at said spaced points, a lane identification circuit jointly responsive to said second beat frequency and to said second reference signal, phase shifting means operated by said comparing means for phase shifting one of the two last mentioned signals by an amount which is a function of the position of the mobile receiving equipment relative to said first set of hyperbolic isophase lines, said lane identification circuit including comparison means responsive to the phase relationship between the output of the phase shifting means and the other of said two last mentioned signals, means for introducing another phase shift into one of said two last mentioned signals, said another phase shift being sufficient to establish a predetermined phase relationship between the two signals to which the comparison means responds, and means for measuring the amount of said another phase shift to provide a second position indication relative to a second set of hyperbolic lines having foci at said spaced points but spaced farther apart than the first set so that said second position indication is less accurate than said first position indication but is useful in resolving ambiguities of the first indication, the spacing of the second set of hyperbolic lines being a function of the frequency difference between the first and second channels.

15. The apparatus defined by claim 14 wherein the means for introducing said another phase shift comprises a servo mechanism operated automatically by said two last mentioned signals.

16. Mobile receiving equipment for use in radio location systems of the hyperbolic, continuous wave type radiating from spaced points at least two position indicating signals and at least two ambiguity resolution signals all having different frequencies, said system being of the type wherein the position indicating signals are heterodyned at a fixed point in the system to develop a first difference frequency while the ambiguity resolution signals are similarly heterodyned to develop a second difference frequency and wherein said first and second difference frequencies are respectively used to produce first and second reference signals for radiation from said fixed point, said mobile receiving equipment comprising means for receiving all of said signals to detect the first and second reference signals, to heterodyne the position indicating signals to develop a first beat frequency and to heterodyne the ambiguity resolution signals to develop a second beat frequency, means responsive to the first beat frequency and the first reference signal for providing a first position indication accurately representing the location of the mobile receiving equipment relative to a first set of hyperbolic isophase lines having foci at said spaced points, a lane identification circuit jointly responsive to said second beat frequency and to said second reference signal, phase shifting means operated by the means providing the first indication for phase shifting one of the two last mentioned signals by a first amount which is a function of the position of the mobile receiving equipment relative to said first set of hyperbolic isophase lines, said lane identification circuit including comparison means for comparing the phase of the ouput of the phase shifting means with that of the other of said two last mentioned signals in order to provide an output signal which is nulled when the compared signals bear a predetermined phase relationship, means for phase shifting one of said two last mentioned signals by a second amount of sufficient value to establish said predetermined phase relationship, and means for measuring said second amount to provide a second position indication relative to a second set of hyperbolic lines having foci at said spaced points but spaced farther apart than the first set so that said second position indication is less accurate than said first position indication but is useful in resolving ambiguities of the first indication.

17. The apparatus defined by claim 16 wherein the means for phase shifting by said second amount comprises a servo mechanism operated automatically by said two last mentioned signals.

18. Mobile receiving equipment for use in radio location systems of the hyperbolic, continuous wave type radiating from spaced points at least two position indicating signals and at least two ambiguity resolution signals, said position indicating signals differing from each other in frequency but falling within a first channel, said ambiguity resolution signals also differing from each other but falling within a second channel distinguishable from the first channel, said system being of the type wherein the position indicating signals are heterodyned at a fixed point in the system to develop a first difference frequency while the ambiguity resolution signals are similarly heterodyned to develop a second difference frequency and wherein said first and second difference frequencies are respectively used to produce first and second reference signals modulated upon at least one carrier wave, said mobile receiving equipment comprising means for receiving all of said signals to detect the first and second reference signals, to heterodyne the position indicating signals to develop a first beat frequency and to heterodyne the ambiguity resolution signals to develop a second beat frequency, means for comparing the phase of the first beat frequency with that of the first reference signal to develop a first position indication accurately representing the location of the mobile receiving equipment relative to a first set of hyperbolic isophase lines having foci at said spaced points, phase comparison means jointly responsive to said second beat frequency and to said second reference signal, phase shifting means operated by said comparing means for introducing into one of the two last mentioned signals a phase shift which is a function of the position of the mobile receiving equipment relative to said first set of hyperbolic isophase lines, said phase comparison means including means responsive to any phase difference between the output of the phase shifting means and the other of said two last mentioned signals to provide a second position indication relative to a second set of hyperbolic lines having foci at said spaced points but spaced farther apart than the first set so that said second position indication is less accurate than said first position indication but is useful in resolving ambiguities of the first indication, the spacing of the second set of hyperbolic lines being a function of the frequency difference between the first and second channels.

19. The apparatus defined by claim 18 wherein the means for providing the second position indication includes a servo mechanism operated in response to any phase difference between the output of the phase shifting means and said other last mentioned signal.

20. Mobile receiving equipment for use in radio location systems of the hyperbolic, continuous wave type radiating from spaced points at least two position indicating signals and at least two ambiguity resolution signals all having different frequencies, said system being of the type wherein the position indicating signals are heterodyned at a fixed point in the system to develop a first difference frequency while the ambiguity resolution signals are similarly heterodyned to develop a second difference frequency and wherein said first and second difference frequencies are respectively used to produce first and second reference signals for radiation from said fixed point, said mobile receiving equipment comprising means for receiving all of said signals to detect the first and second reference signals, to heterodyne the position indicating signals to develop a first beat frequency and to heterodyne the ambiguity resolution signals to develop a second beat frequency, means responsive to the phase relationship between the first beat frequency and the first reference signal for providing a first position indication accurately representing the location of the mobile receiving equipment relative to a first set of hyperbolic isophase lines having foci at said spaced points, phase comparison means for comparing the phases of said second beat frequency and said second reference signal to provide a second position indication representing the location of the receiving equipment relative to a second set of hyperbolic lines having foci at said spaced points but spaced farther apart than the first set so that said second position indication is less accurate than said first position indication but is useful in resolving ambiguities of the first indication, and phase shifting means operated by the means providing the first indication for phase shifting one of the two last mentioned signals prior to the comparison by an amount which is a function of the position of the mobile receiving equipment relative to said first set of hyperbolic isophase lines.

21. Mobile receiving equipment for use in radio location systems of the hyperbolic, continuous wave type radiating from spaced points at least two position indicating signals and at least two ambiguity resolution signals all having different frequencies, said system being of the type wherein the position indicating signals are heterodyned at a fixed point in the system to develop a first difference frequency while the ambiguity resolution signals are similarly heterodyned to develop a second difference frequency and wherein said first and second difference frequencies are respectively used to produce first and second reference signals for radiation from said fixed point, said mobile receiving equipment comprising means for receiving all of said signals to detect the first and second reference signals, to heterodyne the position indicating signals to develop a first beat frequency and to heterodyne the ambiguity resolution signals to develop a second beat frequency, means responsive to the first beat frequency and the first reference signal for providing a first position indication accurately representing the location of the mobile receiving equipment relative to a first set of hyperbolic isophase lines having foci at said spaced points, phase comparison means jointly responsive to said second beat frequency and to said second reference signal, phase shifting means operated by the means providing the first indication for phase shifting one of the two last mentioned signals by an amount which is a function of the position of the mobile receiving equipment relative to said first set of hyperbolic isophase lines, said phase comparison means including means responsive to any phase difference between the output of the phase shifting means and the other of said two last mentioned signals to provide a second position indication relative to a second set of hyperbolic lines having foci at said spaced points but spaced farther apart than the first set so that said second position indication is less accurate than said first position indication but is useful in resolving ambiguities of the first indication.

References Cited by the Examiner

UNITED STATES PATENTS

| | | | |
|---|---|---|---|
| 2,872,676 | 2/59 | Hunsicker | 343—105 |
| 2,976,530 | 3/61 | Werner et al. | 343—117 |
| 3,027,556 | 3/62 | Hunsicker et al. | 343—105 |

CHESTER L. JUSTUS, *Primary Examiner.*